United States Patent
Ichihara et al.

(10) Patent No.: US 8,075,686 B2
(45) Date of Patent: Dec. 13, 2011

(54) METHOD FOR REDUCING ORGANIC CHLORINE COMPOUNDS IN CEMENT PRODUCTION FACILITY, AND CEMENT PRODUCTION FACILITY

(75) Inventors: Katsuhiko Ichihara, Chichibu-gun (JP); Eiji Koike, Chichibu-gun (JP); Munenori Ohgoshi, Kitakyushu (JP); Hisanobu Tanaka, Fukaya (JP); Ichiro Ebato, Kitakyushu (JP); Kimitoshi Mizutani, Kitakyushu (JP)

(73) Assignee: Mitsubishi Materials Corporation, Tokyo (JP)

( * ) Notice: Subject to any disclaimer, the term of this patent is extended or adjusted under 35 U.S.C. 154(b) by 947 days.

(21) Appl. No.: 11/917,683

(22) PCT Filed: Jun. 16, 2006

(86) PCT No.: PCT/JP2006/312128
§ 371 (c)(1),
(2), (4) Date: Dec. 14, 2007

(87) PCT Pub. No.: WO2006/135047
PCT Pub. Date: Dec. 21, 2006

(65) Prior Publication Data
US 2009/0084290 A1    Apr. 2, 2009

(30) Foreign Application Priority Data

Jun. 16, 2005  (JP) .................................. 2005-177019
Jul. 14, 2005  (JP) .................................. 2005-205064
Jul. 22, 2005  (JP) .................................. 2005-213442

(51) Int. Cl.
C04B 7/60          (2006.01)

(52) U.S. Cl. .......................... 106/752; 106/739; 106/745
(58) Field of Classification Search ................... 106/745, 106/739, 752
See application file for complete search history.

(56) References Cited

U.S. PATENT DOCUMENTS

| 4,081,285 | A | * | 3/1978 | Pennell ......................... 106/740 |
| 4,115,137 | A | * | 9/1978 | Nudelman et al. ............ 106/740 |
| 4,678,514 | A | * | 7/1987 | Deyhle et al. ................. 106/745 |
| 5,177,305 | A | * | 1/1993 | Pichat ........................... 588/257 |
| 5,374,310 | A | * | 12/1994 | Bunce et al. .................. 106/739 |
| 6,436,168 | B1 | * | 8/2002 | Uematsu et al. ................ 75/471 |

(Continued)

FOREIGN PATENT DOCUMENTS

JP    11 100243    4/1999

(Continued)

OTHER PUBLICATIONS

U.S. Appl. No. 11/994,066, filed Dec. 27, 2007, Ichihara, et al.

(Continued)

*Primary Examiner* — Paul Marcantoni
(74) *Attorney, Agent, or Firm* — Oblon, Spivak, McClelland, Maier & Neustadt, L.L.P.

(57) ABSTRACT

The method for reducing organic chlorine compounds in cement production facility is a method by which a quantity of organic chlorine compounds contained in powder is reduced in the cement production facility, and the method is provided with a heating step for heating the powder to separate the organic chlorine compounds from the powder or decompose the organic chlorine compounds and a gas thermal decomposing step for supplying heat-treated gas containing the organic chlorine compounds generated by heating the powder to a high temperature part of the cement production facility, thereby thermally decomposing the organic chlorine compounds contained in the heat-treated gas.

16 Claims, 6 Drawing Sheets

U.S. PATENT DOCUMENTS 7,265,254 B2 * 9/2007 Yamamoto et al. ............ 588/316

FOREIGN PATENT DOCUMENTS

| | | |
|---|---|---|
| JP | 2000 157832 | 6/2000 |
| JP | 2002 147722 | 5/2002 |
| JP | 2003 103243 | 4/2003 |
| JP | 2004 244308 | 9/2004 |

OTHER PUBLICATIONS

Office Action issued Sep. 6, 2011, in Japan Patent Application No. 2005-205064 (with English-language Translation) The three Japanese references cited in this Office Action were cited on the IDS filed on Jan. 11, 2008 and considered by the Examiner on Feb. 17, 2011.

* cited by examiner

METHOD FOR REDUCING ORGANIC CHLORINE COMPOUNDS IN CEMENT PRODUCTION FACILITY, AND CEMENT PRODUCTION FACILITY

TECHNICAL FIELD

The present invention relates to a method for reducing organic chlorine compounds in cement production facility and the cement production facility therefor. More specifically, it relates to technologies capable of heat-treating organic chlorine compounds such as dioxins and PCBs (polychlorinated biphenyls) exhausted from cement production facility to reduce the exhausted quantities thereof.

The present application is a 371 of PCT/JP06/312128, filed on Jun. 16, 2006, and claims priority to Japanese Patent Application No. 2005-177019 filed on Jun. 16, 2005, Japanese Patent Application No. 2005-205064 filed on Jul. 14, 2005, and Japanese Patent Application No. 2005-213442 filed on Jul. 22, 2005, the descriptions of which are incorporated herein by reference.

BACKGROUND ART OF THE INVENTION

Dioxin (PCDD) is an abbreviated name for poly chloro dibenzo-p-dioxin, which is one type of organic chlorine compound. There is known poly chloro dibenzo-furan (PCDF) which is similar to the dioxin.

In particular, 2,3,7,8-tetra chloro dibenzo-p-dioxin (2,3,7,8-T4CDD), which belongs to tetra chloro dibenzo-p-dioxins (T4CDDs) as tetrachlorides of dioxins (PCDDs), and has chlorine in the 2-, 3-, 7-, and 8-positions, is the highest in toxicity.

The 2,3,7,8-tetra chloro dibenzo-p-dioxin is generated as a by-product in the production of trichloro phenol, 2,4,5-trichloro phenoxyacetic acid, and also generated as chloridization of dibenzo-p-dioxin. The melting point is 306° C. to 307° C.

There is known, for example, PCB (polychlorinated biphenyl), which is another organic chlorine compound harmful to humans. PCB high in chemical stability, insulation properties, incombustibility and adherence, has been used as insulating oil for transformers and capacitors installed in electrical equipment at power plants, railways and buildings. However, since PCB contains coplanar PCBs which are toxic as with dioxin, the substance has been prohibited from production, distribution and new applications on the basis of laws developed in 1974.

Methods for treating PCBs include, for example, an incineration treatment method for heat-treating PCBs at high temperatures, a dechlorination decomposition method for subjecting PCBs to dechlorination, and a supercritical hydroxylation decomposition method for using supercritical water to decompose PCBs into carbon dioxide and water. Of these methods, with the incineration treatment method, there is a concern that dioxins may be synthesized when gases generated in heat-treating PCBs are cooled.

Then, there are known conventional technologies, for example, those described in the following Patent Documents 1 and 2.

Patent Document 1 has disclosed a method in which gas exhausted from cement production facility is supplied to a dust collector for collecting dust including organic chlorine compounds, and at least some of the thus collected dust is fed into a high temperature part of cement production facility, which is kept at temperatures exceeding 800° C. Since dioxins undergo thermal decomposition at about 800° C., this method can be used to effectively decompose dioxins. Gas exhausted from cement production facility includes, for example, exhaust gas from a raw material dryer (a raw material processing area) for drying cement raw materials, and exhaust gas from a raw material mill (a raw material processing area) for crushing cement raw materials.

Further, evaporated organic chlorine compounds are contained to some extent also in dust-removed gas which is exhausted from a dust collector and released into the atmosphere from a gas duct. Patent Document 1 has disclosed a method for reducing dioxin concentrations in dust-removed gas as a preventive measure thereof. In other words, exhaust gas is drawn out from a place at which the temperature is kept from 30° C. to 400° C., (a low temperature part) in cement production facility, and the thus drawn out exhaust gas is supplied to the dust collector. Exhaust gas guided from the low temperature part is higher in concentration of organic chlorine compounds (low-temperature concentration) as compared with exhaust gas from a high temperature part of cement production facility. Therefore, this method is used to collect and remove dust in which organic chlorine compounds are concentrated, thus making it possible to reduce the concentration of dioxins in the dust-removed gas.

Patent Document 2 has disclosed a method for decomposing PCBs, while generation of dioxins is prevented. In other words, PCB-containing materials delivered to a cement plant from outside are fed into a rotary kiln at which the PCB-containing materials are heated by using heat (1000° C. or higher) generated on calcination of cement clinker, thereby effecting thermal decomposition of PCBs. Then, after exhaust gas generated during thermal decomposition is guided from the outside of the rotary kiln, the gas is cooled rapidly at a speed of 20° C./sec or higher. The exhaust gas is rapidly cooled at 20° C./sec or higher, by which the gas passes in a short time through a temperature range at which dioxins are synthesized in an increased quantity. Therefore, this method is used to decompose PCBs, while generation of dioxins is prevented.

PATENT DOCUMENT 1: Japanese Published Unexamined Patent Application No. 2004-244308
PATENT DOCUMENT 2: Japanese Published Unexamined Patent Application No. 2002-147722

DETAILED DESCRIPTION OF THE INVENTION

Problems to be Solved by the Invention

As described so far, in Patent Document 1, exhaust gas is allowed to pass through a dust collector, in which at least some of the thus collected dust is fed into a high temperature part of cement production facility at which the temperature rises up to 800° C. or higher on normal operation to thermally decompose dioxins adsorbed by dust. In this instance, as a measure for treating organic chlorine compounds in dust-removed gas (gas which has passed through the dust collector) which is released into the atmosphere through a gas duct, a method is adopted for drawing out exhaust gas from a point (a low temperature part) at which the temperature is kept from 30° C. to 400° C. in cement production facility and supplying the gas to the dust collector.

However, this method is not able to attain a sufficient reduction of dioxins exhausted from cement production facility. In other words, cement raw materials which contain organic chlorine compounds are fed into a raw material dryer and a raw material mill which are heated by exhaust gas from the upper part of a preheater up to an internal temperature of about 300° C., by which dioxins are evaporated. As a result, the exhaust gas (in particular, dust) from the raw material mill contains organic chlorine compounds.

On the other hand, cement raw materials crushed by the raw material mill are continuously fed into the upper part of the preheater. In this instance, organic chlorine compounds attached to the cement raw materials are to be substantially subjected to thermal decomposition in association with the descent of cement raw materials inside the preheater. Such thermal decomposition does not take place in reality but the organic chlorine compounds are evaporated (separated) due to heat at the upper part of the preheater (including heat of exhaust gas), mixed into the exhaust gas, as they are, and returned to the raw material mill or others. Thereby, the organic chlorine compounds are circulated in raw material processes of cement production and gradually increased in concentration. As a result, an increased quantity of dioxins exhausted from cement production facility is found.

Further, in Patent Document 2, PCB-containing materials delivered from outside a system of cement production facility (external source) are heated up to 1000° C. or higher and thermally decomposed inside a rotary kiln. However, this method is unable to remove PCBs generated inside cement production facility.

Therefore, the inventor has diligently conducted research and obtained the following findings, with attention focused on causes for generating dioxins and PCBs as organic chlorine compounds (chlorine content) contained in cement raw materials.

First, before the cement raw materials containing organic chlorine compounds are fed into a raw material mill, they are preliminarily heated up to about 300° C. The cement raw materials also include dust which contains organic chlorine compounds. Therefore, organic chlorine compounds such as precursors of dioxins can be separated from cement raw materials before heat treatment inside cement production facility or can be decomposed.

Second, before cement raw materials which contain organic chlorine compounds are fed into a preheater for heating, the cement raw materials are heated by using an organic matter remover. Thereby, organic chlorine compounds such as precursors of dioxins can be separated from cement raw materials before being heated inside cement production facility or from cement raw materials before preliminarily heated by a preheater or can be decomposed.

Further, heat-treated gas containing organic chlorine compounds generated on preliminary heating or heat-treated gas containing organic chlorine compounds generated on heating by an organic matter remover is supplied to a high temperature part of cement production facility at which the temperature is increased to 800° C. or higher on normal operation. Thereby, it is possible to thermally decompose organic chlorine compounds contained in the heat-treated gas.

Third, powder (dust or the like) existing inside cement production facility and containing organic chlorine compounds such as dioxins and PCBs is allowed to be in contact with high-temperature gas of 100° C. or higher inside the cement production facility, thereby making it possible to separate organic chlorine compounds such as precursors of dioxins from the powder or decompose the organic chlorine compounds contained in the powder. Further, heat-treated gas, which contains the organic chlorine compounds separated from the powder, is allowed to be in contact with an adsorbing powder having functions of adsorbing the organic chlorine compounds, thereby adsorbing the organic chlorine compounds on the adsorbing powder. Then, the adsorbing powder, which has adsorbed the organic chlorine compounds, is used as a fuel for calcinating cement. The organic chlorine compounds are decomposed while burning the adsorbing powder, thereby, the organic chlorine compounds in the heat-treated gas can be thermally decomposed.

The inventor has made the present invention on the basis of the above described findings.

An object of the present invention is to provide a method for reducing organic chlorine compounds in cement production facility, which is capable of reducing a quantity of organic chlorine compounds such as dioxins and PCBs exhausted from the cement production facility and also capable of saving fuel for calcinating cement raw materials, and also to provide the cement production facility.

Means for Solving the Problem

The present invention relates to a method for reducing organic chlorine compounds in cement production facility by which a quantity of organic chlorine compounds contained in powder is reduced in the cement production facility, and the method is provided with a heating step for heating the powder to separate the organic chlorine compounds from the powder or decompose the organic chlorine compounds and a gas thermal decomposing step for supplying heat-treated gas containing the organic chlorine compounds generated by heating the powder to a high temperature part of the cement production facility to thermally decompose the organic chlorine compounds contained in the heat-treated gas.

In the method for reducing organic chlorine compounds in the cement production facility of the present invention, the powder may be cement raw materials (limestone, clay, silica stone, iron material and the like) which contain the organic chlorine compounds and/or dust (dust collected in raw material processes during cement production, dust collected in calcination processes and the like) collected inside the cement production facility. Further, it may be intermediate products obtained in the course of producing cement (cement clinker and the like), by-products in finishing processes (cement dust and the like), or waste (oil-contaminated sludge and the like). Cement raw materials may contain those free of organic chlorine compounds to some extent.

According to the method for reducing organic chlorine compounds in the cement production facility of the present invention, powder containing organic chlorine compounds is heated, by which the organic chlorine compounds are separated (evaporated) from the powder or the organic chlorine compounds contained in the powder are decomposed (heating step). The powder, which has passed through the heating step, is supplied to a raw material mill and crushed while being heated. Heat-treated gas containing organic chlorine compounds generated by heating the powder is supplied to a high temperature part of the cement production facility and heated at the high temperature part, by which the organic chlorine compounds contained in the heat-treated gas are thermally decomposed (gas thermal decomposing step).

As described above, the powder containing organic chlorine compounds is heated, by which precursors of dioxins or the like are removed from the powder before dioxins are synthesized from organic chlorine compounds (chlorine). Further, organic chlorine compounds separated from the powder are fed into a high temperature part of cement production facility together with heat-treated gas generated inside a preliminary heater, thereby thermally decomposing the organic chlorine compounds contained in heat-treated gas. As a result, it is possible to reduce the quantity of organic chlorine compounds such as dioxins and PCBs exhausted from the cement production facility to a greater extent as compared with conventional facility.

In a conventional case (for example, the invention disclosed in Patent Document 1), since dust is fed into a high temperature part inside cement production facility, at which the temperature is increased to 800° C. or higher, foreign matter (dust) is mixed into the thus obtained cement to decrease the quality of the cement. Further, in a calcination process, it is necessary to conduct a complicated temperature control of cement raw materials depending on a quantity of dust to be fed. On the other hand, according to the present invention, since powder is mixed into cement raw materials prior to a raw material process, it is possible to reduce disadvantages such as a decreased quality of cement in the course of cement production and temperature control of cement raw materials necessary in the calcination process.

In the method for reducing organic chlorine compounds in the cement production facility of the present invention, the cement production facility are normally operated preferably at a temperature of 800° C. or higher and more preferably at 850° C. or higher. When the temperature is in this range, it is possible to attain a complete thermal decomposition of organic chlorine compounds such as dioxins. When the temperature at a high temperature part is lower than 800° C., it is impossible to attain a complete thermal decomposition of organic chlorine compounds such as dioxins.

In the method for reducing organic chlorine compounds in the cement production facility of the present invention, the cement production facility may be calcination equipment (for example, a rotary kiln) or facility having a first preliminary heater, a calcinator, a rotary kiln and the like. In this instance, high temperature parts include facilities at which the temperature becomes 800° C. or higher on normal operation, for example, the lower stage part of the first preliminary heater (850° C.), the calcinator (850° C.), the posterior chamber of the rotary kiln (1000° C.), the anterior chamber of the rotary kiln (a maximum temperature of 1450° C.), and the high temperature part of a clinker cooler (800° C. or higher). All heat-treated gas containing organic chlorine compounds may be fed into one of these facilities, or the heat-treated gas may be fed into a plurality of these facilities or all of them at a predetermined ratio. It is noted that the high temperature part of the clinker cooler is, for example, an upstream part of the clinker cooler into which cement clinker is fed from the rotary kiln.

When heat-treated gas containing organic chlorine compounds is supplied to the lower stage part of the first preliminary heater or the calcinator, the heat-treated gas is used as air for calcinating cement raw materials, and organic chlorine compounds contained in the heat-treated gas are thermally decomposed by the heat on calcination.

When the heat-treated gas is supplied to any one of the posterior chamber of a rotary kiln, the anterior chamber of the rotary kiln and the high temperature part of a clinker cooler, the heat-treated gas is used as air for calcinating cement raw materials, and organic chlorine compounds contained in the heat-treated gas are thermally decomposed by the heat on calcination of clinker.

When heat-treated gas is supplied to the anterior chamber of a rotary kiln, the heat-treated gas may be supplied to a combustion burner together with a fuel or to the rotary kiln in separation from the fuel. There is no particular limitation on a position at which the heat-treated gas is supplied to the rotary kiln.

The temperature at which cement is calcinated, for example, inside a rotary kiln, is usually 1100° C. to 1450° C., which exceeds the temperature at which organic chlorine compounds are thermally decomposed (700° C.). Therefore, organic chlorine compounds contained in heat-treated gas are thermally decomposed during calcination of the cement clinker and rendered harmless. In this instance, time necessary for the rotary kiln to effect calcination (raw material retaining time=thermal decomposition time of organic chlorine compounds) is from 30 to 60 minutes. The organic chlorine compounds are thermally decomposed by a several-second heating, for example, at a temperature of 900° C.

In the method for reducing organic chlorine compounds in the cement production facility of the present invention, the heating step may be that in which the powder is supplied to an organic matter remover and heated before it is supplied to the first preliminary heater.

In raw material processes in the initial stage of cement production, for example, treatment in which cement raw materials with a high water content are dried by using a raw material dryer and treatment in which cement raw materials are crushed by using a raw material mill are performed. Exhaust gas from the upper part of a first preliminary heater (a preheater) on preliminary heating is introduced respectively into the raw material dryer and the raw material mill for which the temperature thereinside is about 300° C. Organic chlorine compounds are abundantly contained in the exhaust gas (dust contained in the exhaust gas) released into the atmosphere from the raw material dryer, the raw material mill and others via the gas duct.

On the other hand, cement raw materials crushed by the raw material mill are continuously fed into the upper part of the first preliminary heater. In this instance, organic chlorine compounds attached to the cement raw materials are to be substantially subjected to thermal decomposition in association with the descent of the cement raw materials inside the first preliminary heater. Such thermal decomposition does not take place in reality, but the organic chlorine compounds are separated (evaporated) by the heat (including the heat of exhaust gas) resulting from the upper part of the first preliminary heater, mixed into the exhaust gas as they are, and returned to the raw material mill or elsewhere. Thereby, the organic chlorine compounds are circulated in raw material processes of cement production and gradually increased in concentration. As a result, there is found an increased quantity of dioxins released into the atmosphere from facility conducting raw material processes via the gas duct and consequently an increased quantity of dioxins exhausted from cement production facility.

According to the method for reducing organic chlorine compounds in the cement production facility of the present invention, powder containing the organic chlorine compounds is supplied to an organic matter remover for heating before it is supplied to the first preliminary heater, by which, for example, precursors of dioxins are removed from the powder before dioxins are synthesized from organic chlorine compounds (chlorine) in the powder. Thereby, the circulation of organic chlorine compounds is cut off in raw material processes of cement production, inhibiting the above-mentioned increase in concentration of the organic chlorine compounds. As a result, it is possible to reduce the quantity of organic chlorine compounds such as dioxins and PCBs exhausted from the cement production facility to a greater extent as compared with conventional facility.

It is noted that facility for conducting raw material processes may include, for example, a raw material dryer for drying cement raw materials with a high water content such as clay and a raw material mill for crushing cement raw materials. Further, it is preferable that powder not be treated in any way between an organic matter removing step and a preliminary heating step. There is no particular limitation on the structure of an organic matter remover, as long as it is a unit of heating cement raw materials after they are crushed. For example, a heating screw-type heater may be adopted in which the powder of cement raw materials fed into an externally heated delivery pipe is heated while being delivered by a screw. Further, such a heater may be adopted that has a heated fluidized bed and a cyclone. In the heater, crushed cement raw materials are first fed into the heated fluidized bed to remove organic chlorine compounds from cement raw materials. Then, the thus heated cement raw materials are fed into the cyclone, thereby separating the cement raw materials from heat treated gas which contains organic chlorine compounds.

In the method for reducing organic chlorine compounds in the cement production facility of the present invention, powder is heated by the organic matter remover preferably at a temperature of 300° C. or higher and more preferably at 200° C. or higher. Where the heating temperature is less than 200° C., organic chlorine compounds still remain, resulting in a failure a attain practical removal.

There is no particular limitation on a heat source of the organic matter remover. The heat source may include, for example, exhaust gas generated on calcination of the cement clinker from cement raw materials (exhaust gas (about 350° C.) supplied from the upper part of a first preliminary heater to a raw material mill or the like), exhaust gas (300° C. or higher) from a clinker cooler and exhaust gas (about 200° C. to 300° C.) from the clinker cooler to a gas duct. Further, heated gas from a special gas generator may be used for this purpose.

In the method for reducing organic chlorine compounds in the cement production facility of the present invention, the heat source of the organic matter remover may be at least one of exhaust gas from the upper part of the first preliminary heater, exhaust gas of the clinker cooler for cooling cement clinker discharged from the rotary kiln, and heated gas from a gas generator annexed to the organic matter remover.

The heat source of the organic matter remover may include any one of exhaust gas generated on calcination of the cement clinker from cement raw materials (for example, exhaust gas (about 350° C.)) supplied from the upper part of a preliminary heater to a raw material mill or the like, exhaust gas (300° C. or higher) from a clinker cooler, exhaust gas (about 200° C. to 300° C.) exhausted from the clinker cooler to a gas duct, or a combination thereof.

Heated gas may include, for example, air and combustion gas (including CO and $CO_2$). Further, the gas generator can be heated, for example, by a burner.

In the method for reducing organic chlorine compounds in the cement production facility of the present invention, a heating medium from a heat source (including heated gas from the gas generator) may be supplied inside an organic matter remover to effect a direct heating. Alternatively, the heating medium is supplied to a jacket installed outside the organic matter remover, for example, thereby effecting an indirect heating. The jacket is supplied with at least one of exhaust gas from the upper part of the first preliminary heater, exhaust gas of a clinker cooler for cooling the cement clinker exhausted from the rotary kiln, and heated gas generated from a gas generator annexed to the organic matter remover.

When exhaust gas is supplied as a heat source to the jacket, the heat of the exhaust gas is exchanged with the heat of powder inside an organic matter remover via the jacket and an external wall of the organic matter remover, by which the powder is heated from the outside. Thereby, a decrease in concentration of organic chlorine compounds in the powder (concentration of dioxins) is found. As a result, it is possible to reduce the quantity of organic chlorine compounds such as dioxins and PCBs exhausted from the cement production facility to a greater extent as compared with conventional facility.

Where exhaust gas as a heating medium is high in oxygen concentration, it is preferable to introduce the exhaust gas into an organic matter remover. On the other hand, where exhaust gas is low in oxygen concentration, for example, in the case of exhaust gas supplied to a raw material dryer and a raw material mill via an exhaust gas duct from a preliminary heater, it is preferable to supply the exhaust gas to the jacket of the organic matter remover. It is noted that if exhaust gas after heat exchange inside the jacket is returned to the exhaust gas duct, it is possible to heat-treat organic chlorine compounds contained in the exhaust gas during raw material processes of cement production.

The jacket may be installed at a part of the external wall of the organic matter remover or all over on the external wall. The jacket may be installed at any area of the external wall of the organic matter remover. Further, there is no limitation on the shape or dimension (capacity) of the jacket.

In the method for reducing organic chlorine compounds in the cement production facility of the present invention, the heating step may be that in which the powder is supplied to a second preliminary heater for a preliminary heating before it is supplied to the first preliminary heater.

According to the method for reducing organic chlorine compounds in the cement production facility of the present invention, powder containing organic chlorine compounds is supplied to the second preliminary heater for preliminary heating before it is supplied to the first preliminary heater, by which, for example, precursors of dioxins are removed from the powder before dioxins are synthesized from the organic chlorine compounds (chlorine) in the powder. As a result, it is possible to reduce the quantity of organic chlorine compounds such as dioxins and PCBs exhausted from the cement production facility to a greater extent as compared with conventional facility.

In a conventional case (for example, the invention disclosed in Patent Document 1), since dust is fed into a high temperature part inside cement production facility at which the temperature is increased to 800° C. or higher on normal operation, the thus obtained cement is contaminated with foreign matter (dust) decreasing the quality of the cement. Further, in a calcination process, it is necessary to conduct a complicated temperature control of cement raw materials depending on a quantity of dust to be fed. On the other hand, according to the present invention, since powder is mixed into cement raw materials prior to a raw material process, it is possible to reduce the above-described disadvantages such as a decreased quality of cement in the course of cement production and temperature control of cement raw materials necessary in the calcination process.

In the method for reducing organic chlorine compounds in the cement production facility of the present invention, the temperature of the powder heated by the second preliminary heater, that is, a preliminary heating temperature, is preferably in the range of 100° C. to 600° C. and more preferably in the range of 200° C. to 500° C. Where the preliminary heating temperature is less than 100° C., it is not possible to attain a sufficient separation of organic chlorine compounds from the powder or a sufficient decomposition. Further, where the preliminary heating temperature exceeds 600° C., additional energy is required for heating. Where the temperature is in the range of 200° C. to 500° C., organic chlorine compounds can be sufficiently separated from the powder due to the properties of substances (for example, PCBs), with a smaller extent of energy loss.

There is no particular limitation on the structure of a second preliminary heater, as long as it is a unit annexed outside a system of existing cement production facility. The second preliminary heater includes, for example, a heating screw-type heater, a paddle-type heater and a rotary-type heater. Further, a heater may be adopted that is structured so as to crush powder while preliminarily heating.

In the method for reducing organic chlorine compounds in the cement production facility of the present invention, the heat source of the second preliminary heater may include exhaust gas generated on calcination of the cement clinker from cement raw materials (exhaust gas (about 350° C.) supplied from the upper part of the first preliminary heater to a raw material mill or the like), exhaust gas (300° C. or higher) from a clinker cooler, and exhaust gas (about 200° C. to 300° C.) exhausted from the clinker cooler to a gas duct. Further, in addition to a case where the second preliminary heater is used solely and the heat source is unable to provide sufficient heat, a special heat generator (a hot gas generator) may be used together.

In the method for reducing organic chlorine compounds in the cement production facility of the present invention, a heating medium from a heat source (including a heating medium from a heat generator) may be supplied inside a second preliminary heater to effect a direct heating or the heating medium is supplied to a jacket installed outside the second preliminary heater, for example, to effect an indirect heating. The jacket is supplied with at least one of exhaust gas from the upper part of the first preliminary heater, exhaust gas of a clinker cooler for cooling cement clinker exhausted from the rotary kiln, and heated gas generated from a gas generator annexed to the second preliminary heater.

When exhaust gas as a heat source is supplied to the jacket, the heat of the exhaust gas is exchanged with the heat of the powder inside the second preliminary heater via the jacket and an external wall of the second preliminary heater, by which the powder is heated from outside. Thereby, a decreased concentration of organic chlorine compounds in the powder (for example, dioxin concentration) is found. As a result, it is possible to reduce the quantity of organic chlorine compounds such as dioxins and PCBs exhausted from the cement production facility to a greater extent as compared with conventional facility.

Where exhaust gas as a heating medium is high in oxygen concentration, it is preferable to introduce the exhaust gas into a second preliminary heater. On the other hand, where exhaust gas is low in oxygen concentration, for example, in the case of the exhaust gas supplied to a raw material dryer and a raw material mill via an exhaust gas duct from a first preliminary heater, it is preferable to supply the exhaust gas to the jacket of the second preliminary heater. If exhaust gas after the heat exchange inside the jacket is returned to the exhaust gas duct, it is possible to heat-treat organic chlorine compounds contained in the exhaust gas in a raw material process of cement production.

The jacket may be installed at a part of the external wall of the second preliminary heater or all over on the external wall. The jacket may be installed at any area of the external wall of the second preliminary heater. Further, there is no limitation on the shape or dimension (capacity) of the jacket.

In the method for reducing organic chlorine compounds in the cement production facility of the present invention, the powder, which has been preliminarily heated by the second preliminary heater, may be subjected to normal treatment in cement production.

In this instance, the normal treatment in the course of cement production is a series of treatments associated with cement production in which, for example, where cement production facility have a preliminary heater and a rotary kiln, cement raw materials crushed by a raw material mill are stored in a storage silo, then, the cement raw materials in the storage silo are heated (preheated) until limestone is decarbonated by using the preliminary heater, the thus heated cement raw materials are heated inside the rotary kiln to calcinate the cement clinker, and the cement clinker is thereafter fed into a clinker cooler to effect cooling.

The present invention relates to a method for reducing organic chlorine compounds in cement production facility by which a quantity of organic chlorine compounds contained in powder is reduced in the cement production facility, and the method which is provided with an organic matter removing step in which the powder is allowed to be in contact with high-temperature gas inside the cement production facility, thereby separating the organic chlorine compounds from the powder or decomposing the organic chlorine compounds, a powder removing step in which the powder contained in the high-temperature gas, which has been in contact with the powder, is collected to remove the powder from the high-temperature gas and an organic matter adsorbing step in which the high-temperature gas, from which the powder has been removed, is allowed to be in contact with an adsorbing powder, thereby adsorbing the organic chlorine compounds on the adsorbing powder.

In the method for reducing organic chlorine compounds in the cement production facility of the present invention, the powder may be cement raw materials containing the organic chlorine compounds (limestone, clay, silica stone, iron material and the like), and/or dust collected inside the cement production facility (dust collected in a raw material process of cement production, dust collected in a calcination process or the like). It is noted that those free of organic chlorine compounds may be mixed into some of the cement raw materials.

According to the method for reducing organic chlorine compounds in the cement production facility of the present invention, powder containing organic chlorine compounds is allowed to be in contact with high-temperature gas inside cement production facility, thereby separating (evaporating) the organic chlorine compounds from the powder or decomposing the organic chlorine compounds contained in the powder (organic matter removing step).

Powder contained in high-temperature gas after being in contact with the powder is collected, thereby removing the powder from the high-temperature gas (powder removing step). The high-temperature gas, from which the powder has been removed, is allowed to be in contact with an adsorbing powder, by which organic chlorine compounds in the high-temperature gas are adsorbed on the adsorbing powder (organic matter adsorbing step). Thereby, it is possible to reduce the quantity of organic chlorine compounds such as dioxins and PCBs exhausted from the cement production facility to a greater extent as compared with conventional facility. It is noted that organic chlorine compounds removed from the powder are residual organic chlorine compounds, typical examples of which are dioxins (including precursors) and PCBs.

In the method for reducing organic chlorine compounds in the cement production facility of the present invention, the temperature of the high-temperature gas is preferably at 100° C. or higher and more preferably at 200° C. or higher. Separation of dioxins from powder requires heating of the powder up to 100° C. or higher, whereas decomposition of dioxins requires heating of the powder up to 800° C. or higher. Further, separation of PCBs from powder requires heating of the powder up to 100° C. or higher, whereas decomposition of PCBs requires heating of the powder up to 800° C. or higher. Where the high-temperature gas is at a temperature of 100° C. or higher, both dioxins and PCBs can be removed from the powder.

In the method for reducing organic chlorine compounds in the cement production facility of the present invention, the adsorbing powder, which has adsorbed the organic chlorine compounds, may be used as a fuel on calcination of the cement clinker and the adsorbing powder may be burnt to decompose the organic chlorine compounds. When the adsorbing powder, which has adsorbed the organic chlorine compounds, is fed from a fuel feeding port, for example, as a fuel of a burner of a rotary kiln, organic chlorine compounds adsorbed on the adsorbing powder are instantaneously decomposed by the heat resulting from burner flame (1500° C. or higher).

In the method for reducing organic chlorine compounds in the cement production facility of the present invention, the powder removed by the powder removing step may be fed into a raw material mill for crushing the cement raw materials for calcination. When the powder is fed into the raw material mill, it is incorporated into a part of the cement raw materials, thus making it possible to improve productivity of the cement raw materials.

In the method for reducing organic chlorine compounds in the cement production facility of the present invention, the adsorbing powder may be at least one of coal fine powder, activated carbon fine powder and oil coke fine powder. The adsorbing powder, which has adsorbed organic chlorine compounds, is used as a fuel on calcination of the cement clinker, thus making it possible to save fuels for calcination. It is noted that there is no limitation on the adsorbing powder, as long as it is a powder capable of adsorbing organic chlorine compounds such as dioxins and PCBs in exhaust gas. However, porous powder high in absorption of organic chlorine compounds is preferable.

The greater the amount of adsorbing powder supplied into the high-temperature gas, the better the result will be. However, an excessive supply of the adsorbing powder may result in an increased load of dust removing facility. Therefore, it is preferable to adopt an adsorbing powder high in BET specific surface area. It is preferable that the adsorbing powder is 0.1 $m^2/g$ in BET specific surface area. Where the BET specific surface area is less than 0.1 $m^2/g$, no practical adsorption performance is obtained. An adsorbing powder high in BET specific surface area is used to adsorb a greater quantity of organic chlorine compounds in a smaller quantity of the adsorbing powder, thus making it possible to reduce the load of a dust collector.

There is no particular limitation on high-temperature gas. The high-temperature gas may include, for example, exhaust gas generated on calcination of the cement clinker from cement raw materials (exhaust gas (about 350° C.) supplied from the upper part of a first preliminary heater to a raw material mill or the like), exhaust gas (300° C. or higher) from a clinker cooler and exhaust gas (about 200° C. to 300° C.) from the clinker cooler to a gas duct.

There is no particular limitation on the means for allowing the adsorbing powder to be in contact with a high-temperature gas. For example, a feeding port of the adsorbing powder is formed at a halfway point of the piping of the high-temperature gas, and a feeding system of the adsorbing powder may be connected to the feeding port. A screw feeder may be adopted as the feeding system of the adsorbing powder.

There is no limitation on the structure of cement production facility. For example, calcination equipment (such as a rotary kiln) or facility having a first preliminary heater, a calcinator, a rotary kiln and others are acceptable.

There is no particular limitation on the means for collecting powder from high-temperature gas. A dust collector such as an electric dust collector or a bag filter may be adopted. In allowing the powder to be in contact with the high-temperature gas, all dust collected by the dust collector may be allowed to be in contact with the high-temperature gas or only some of the dust may be allowed to be in contact with the high-temperature gas.

The present invention relates to cement production facility for calcinating cement clinker from cement raw materials, which are provided with a first preliminary heater for preliminarily heating powder containing organic chlorine compounds, a heater for heating the powder before it is supplied to the first preliminary heater, and a heat-treated gas supply channel for supplying heat-treated gas containing the organic chlorine compounds generated by heating the powder to a high temperature part of the cement production facility.

In the cement production facility of the present invention, the high temperature part may be at least one of the lower stage part of the first preliminary heater, a calcination channel, the posterior chamber of a rotary kiln, the anterior chamber of the rotary kiln and the high temperature part of a clinker cooler.

According to the cement production facility of the present invention, powder containing organic chlorine compounds is heated before it is supplied to the first preliminary heater, for example, precursors of dioxins are removed from the powder before dioxins are synthesized from organic chlorine compounds (chlorine) in the powder. Further, organic chlorine compounds separated from the powder are supplied to a high temperature part of the cement production facility together with heat-treated gas generated inside a preliminary heater, thereby thermally decomposing organic chlorine compounds contained in the heat-treated gas. As a result, it is possible to reduce the quantity of organic chlorine compounds such as dioxins and PCBs exhausted from the cement production facility to a greater extent as compared with conventional facility.

In the cement production facility of the present invention, a heat source of the heater may be at least one of exhaust gas from the upper part of the first preliminary heater, exhaust gas of a clinker cooler for cooling cement clinker discharged from the rotary kiln, and heated gas generated from a gas generator annexed to the organic matter remover.

The cement production facility of the present invention may be provided with a jacket which is installed outside of the heater to heat the powder supplied to the heater. Further, the jacket may be supplied with at least one of exhaust gas from the upper part of the first preliminary heater, exhaust gas of a clinker cooler for cooling cement clinker discharged from the rotary kiln, and heated gas generated from a gas generator annexed to the organic matter remover.

The present invention relates to cement production facility for calcinating cement clinker from cement raw materials, which are provided with a high-temperature gas supply channel for supplying high-temperature gas to a mill of crushing a fuel for calcinating the cement clinker, a powder supply channel for supplying powder containing organic chlorine compounds to the high-temperature gas supply channel, and a collecting device which is installed on the powder supply channel to collect the powder contained in the high-temperature gas after being in contact with the powder, in which the high-temperature gas, from which the powder has been removed, is allowed to be in contact with an adsorbing powder.

According to the cement production facility of the present invention, powder contained in high-temperature gas after being in contact with the powder is collected, thereby the powder is removed from the high-temperature gas. The high-temperature gas, from which the powder has been removed, is allowed to be in contact with an adsorbing powder, thereby adsorbing organic chlorine compounds in the high-temperature gas on the adsorbing powder. As a result, it is possible to reduce the quantity of organic chlorine compounds such as dioxins and PCBs exhausted from the cement production facility to a greater extent as compared with conventional facility.

In the cement production facility of the present invention, the adsorbing powder may be used as the fuel. When the adsorbing powder, which has adsorbed organic chlorine compounds, is fed from a fuel feeding port as a fuel for a burner of a rotary kiln, the organic chlorine compounds adsorbed on the adsorbing powder are instantaneously decomposed by the heat resulting from burner flame.

The cement production facility of the present invention may be provided with a powder supply channel for supplying the powder collected by the collecting means to a raw material mill for crushing the cement raw materials.

According to the cement production facility of the present invention, powder removed from high-temperature gas is fed into a raw material mill for crushing cement raw materials, by which the powder is incorporated in to the cement raw materials. Thereby, it is possible to improve productivity of the cement raw materials.

ADVANTAGEOUS EFFECTS OF THE INVENTION

According to the present invention, powder which contains organic chlorine compounds is heated by a second preliminary heater or an organic matter remover before it is heated by a first preliminary heater, by which, for example, precursors of dioxins are separated from the powder or decomposed before dioxins are synthesized from the organic chlorine compounds. Further, the organic chlorine compounds separated from the powder are fed into a high temperature part of the cement production facility together with heat-treated gas generated inside the organic matter remover, thereby thermally decomposing the organic chlorine compounds contained in the heat-treated gas. As a result, it is possible to reduce the quantity of organic chlorine compounds such as dioxins and PCBs exhausted from the cement production facility to a greater extent as compared with conventional facility.

According to the present invention, powder which contains organic chlorine compounds is allowed to be in contact with high-temperature gas. Thereafter, the powder is removed from the high-temperature gas, the high-temperature gas containing organic chlorine compounds is then allowed to be in contact with an adsorbing powder, thereby adsorbing the organic chlorine compounds on the adsorbing powder. Thereby, it is possible to reduce the quantity of organic chlorine compounds such as dioxins and PCBs exhausted from the cement production facility to a greater extent as compared with conventional facility.

Further, the adsorbing powder, which has adsorbed the organic chlorine compounds, is used as a fuel on calcination of the cement clinker, thus making it possible to save fuels for calcination. The organic chlorine compounds adsorbed on the adsorbing powder are decomposed by the heat on calcination of the cement clinker.

DESCRIPTION OF THE REFERENCE SYMBOLS

Figure 1:
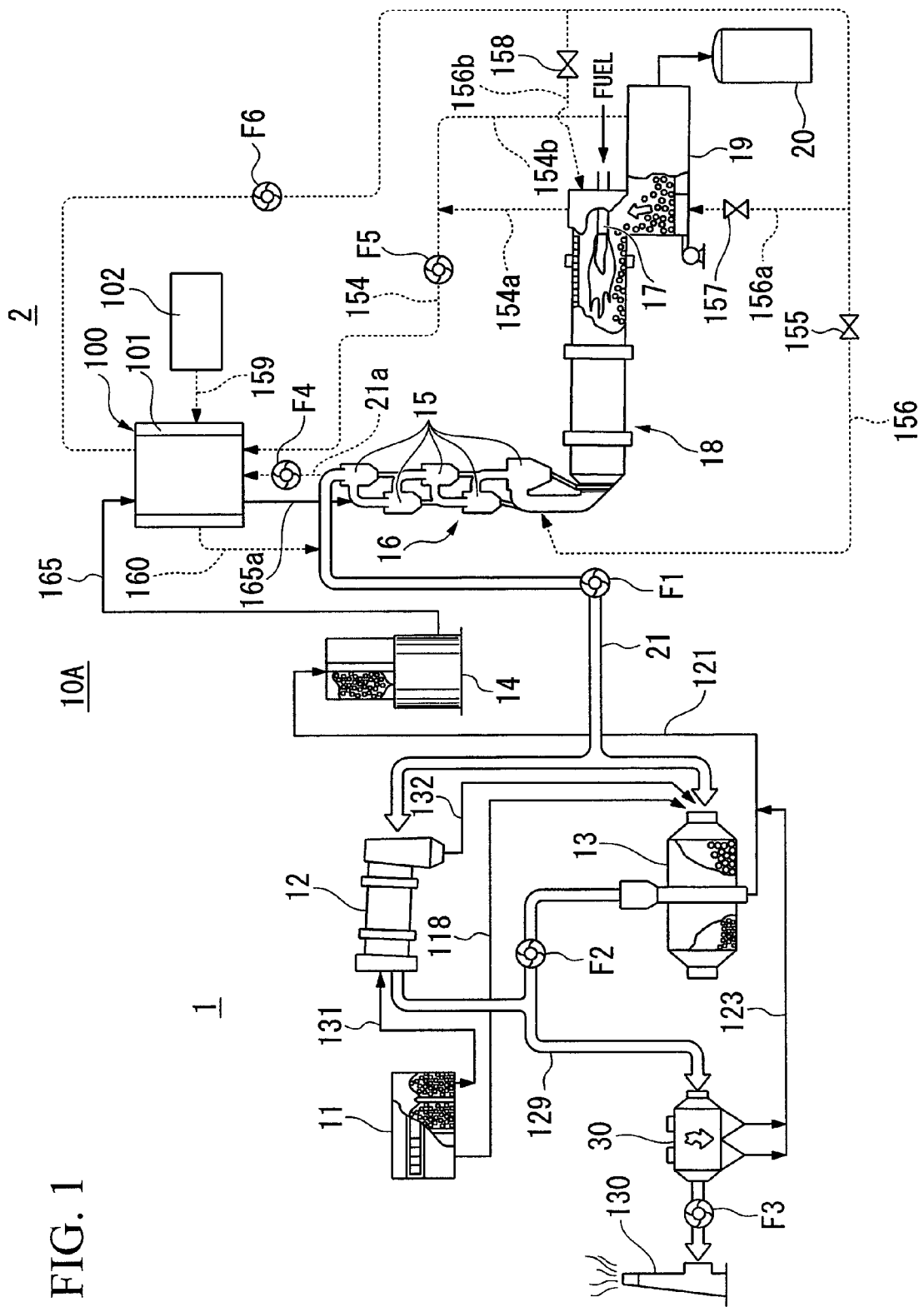
FIG. 1 is a schematic configuration diagram of a cement production facility for carrying out Embodiment 1 of a method for reducing the organic chlorine compounds of the present invention.

1: Raw material processing area
2: Calcination processing area
10A, 10Bm 10C, 10D: Cement production facility
11: Raw material storage shed
12: Raw material dryer
13: Raw material mill
14: Storage silo
16: Preheater
18: Rotary kiln
19: Clinker cooler
30: Electric dust collector
100: Organic matter remover
101: External jacket
102: Gas generator
200: Preliminary heater

BEST MODE FOR CARRYING OUT THE INVENTION

A description will be given of a first embodiment of a method for reducing organic chlorine compounds in a cement production facility and the cement production facility of the present invention by referring to FIG. 1 and FIG. 2.

As illustrated in FIG. 1, the cement production facility 10A of the present embodiment are provided with a raw material processing area 1 for crushing cement raw materials and a calcination processing area 2 for calcinating the thus crushed cement raw materials.

The raw material processing area 1 is provided with a raw material storage shed 11, a raw material dryer 12, a raw material mill 13, a storage silo 14 and an electric dust collector (dust collector) 30. The raw material storage shed 11 individually stores cement raw materials such as limestone, clay, silica stone and iron material. The raw material dryer 12 heats cement raw materials with a high water content in order to dry them. The raw material mill 13 crushes the cement raw materials supplied from the raw material storage shed 11. The storage silo 14 stores the cement raw materials crushed by the raw material mill 13. The electric dust collector 30 collects dust (powder) containing organic chlorine compounds such as dioxins and PCBs in exhaust gas from the raw material dryer 12 and the raw material mill 13.

The raw material storage shed 11 is connected to the raw material mill 13 via a raw material transfer facility 118 and also connected to the raw material dryer 12 via a raw material supply facility 131. The raw material dryer 12 is connected to the raw material mill 13 via a dried raw material discharge facility 132. The raw material mill 13 is connected to the storage silo 14 via a crushed raw material transfer facility 121. Cement raw materials stored at the raw material storage shed 11 are fed into the raw material mill 13 via the raw material transfer facility 118. However, some of the cement raw materials with a high water content such as clay are fed into the raw material dryer 12 via the raw material supply facility 131.

The upper part of a preheater 16 to be described later is connected to the raw material dryer 12 and the raw material mill 13 via an exhaust gas duct 21. The exhaust gas duct 21 is branched at the downstream end into two directions, with one downstream end connected to the raw material dryer 12, and the other downstream end connected to the raw material mill 13. The exhaust gas duct 21 is provided with a fan F1 for transferring exhaust gas. Exhaust gas from the upper part of the preheater 16 at 300° C. or higher is introduced via the exhaust gas duct 21 to the raw material dryer 12 and the raw material mill 13. Upon introduction of the exhaust gas, the temperature inside the raw material dryer 12 is about 300° C., and that inside the raw material mill 13 is 100° C. or higher.

Cement raw materials with a high water content that are fed into the raw material dryer 12 are dried by the heat of exhaust gas introduced via the exhaust gas duct 21, and thereafter fed into the raw material mill 13 via the dried raw material discharge facility 132.

A number of metal balls are accommodated in a rotating drum of the raw material mill 13. When cement raw materials are continuously fed into the rotating drum, with the rotating drum being rotated, cement raw materials are finely crushed by these metal balls, thus obtaining a powder of the cement raw materials crushed into grains of about 90 μm or smaller. The thus crushed cement raw materials are fed into the storage silo 14 via crushed raw material transfer facility 121.

The raw material dryer 12 and the raw material mill 13 are connected to a chimney 130 via the gas duct 129. The gas duct 129 is branched at the upstream end into two directions, with one upstream end connected to the raw material dryer 12 and the other upstream end connected to the raw material mill 13. The electric dust collector 30 is installed at the gas duct 129, which is further downstream than the branched portion. A fan F2 is installed on the gas duct 129 connected to the raw material mill 13. A fan F3 is installed on the gas duct 129 between the electric dust collector 30 and the chimney 130. Exhaust gas used in heating the raw material dryer 12 and the raw material mill 13 is released into the atmosphere via the gas duct 129 and the chimney 130.

The electric dust collector 30 is connected to a halfway point of the crushed raw material transfer facility 121 via dust delivery facility 123. Dust collected by the electric dust collector 30 is fed into the storage silo 14 via the dust delivery facility 123 and the crushed raw material transfer facility 121.

The storage silo 14 is connected to an organic matter remover 100 via a heated raw material powder transfer facility 165. Cement raw materials stored at the storage silo 14 are supplied to the organic matter remover 100 via the heated raw material powder transfer facility 165.

The calcination processing area 2 is provided with a preheater (a first preliminary heater) 16, a burner 17, a rotary kiln 18, a clinker cooler 19, a clinker silo 20, an organic matter remover 100, an external jacket (jacket) 101, and a gas generator 102. The preheater 16 preheats cement raw materials from which organic chlorine compounds have been removed by the organic matter remover 100 so that the cement raw materials can be easily calcinated subsequently in the rotary kiln 18. The lower stage part of the preheater 16 is connected to the posterior chamber of the rotary kiln 18. The rotary kiln 18 heats the cement raw materials by the burner 17 for calcination, thereby obtaining cement clinker. The clinker cooler 19 cools the cement clinker discharged from the anterior chamber of the rotary kiln 18. The clinker silo 20 stores the cement clinker obtained in the rotary kiln 18.

The preheater 16 is provided with a cyclone 15 consisting of five stages in a vertical direction, the inside of which is kept higher in temperature at a lower stage (downstream). The upstream end of an exhaust gas duct 21 is connected to the upper part of the preheater 16. During a sequential passage of cement raw materials from the upper stage to the lower stage of the cyclone 15, the cement raw materials, from which organic chlorine compounds have been removed by the organic matter remover 100, are preheated until limestone in the cement raw materials is decarbonated (the temperature is increased to 300° C. or higher at the upper part of the preheater 16 on normal operation).

The rotary kiln 18 is provided with a kiln shell on which a refractory material is lined and able to produce cement clinker. At the anterior chamber of the rotary kiln 18, cement clinker is calcinated from cement raw materials by the heat of a burner 17 which uses heavy oil or fine powder coal as a fuel.

The organic matter remover 100 heats cement raw materials immediately before they are fed into the preheater 16, thereby separating organic chlorine compounds from the cement raw materials or decomposing the organic chlorine compounds. The external jacket 101 is installed outside the organic matter remover 100, indirectly heating the cement raw materials fed into the organic matter remover 100 by a heat source supplied from the outside. The gas generator 102 supplies heated gas, which is used as a heat source, to the external jacket 101 from the outside of the cement production facility 10A (outside the system).

The organic matter remover 100 is connected via organic matter removed powder transfer facility 165a to a preheater 16. Cement raw materials, from which organic matter has been removed in the organic matter remover 100, are fed into the preheater 16 via the organic matter removed powder transfer facility 165a and preliminarily heated during the passage through each of the cyclones 15 constituting the preheater 16 (on normal operation, cement raw materials are heated up to about 900° C. by the preheater 16).

The preheater 16 is connected to a rotary kiln 18, and the rotary kiln 18 is connected to the clinker cooler 19. Preheated cement raw materials are heated by a burner 17, while being rotated inside the kiln shell of the rotary kiln 18. Thereby, cement clinker is calcinated. The thus obtained cement clinker is cooled inside the clinker cooler 19.

Figure 2:
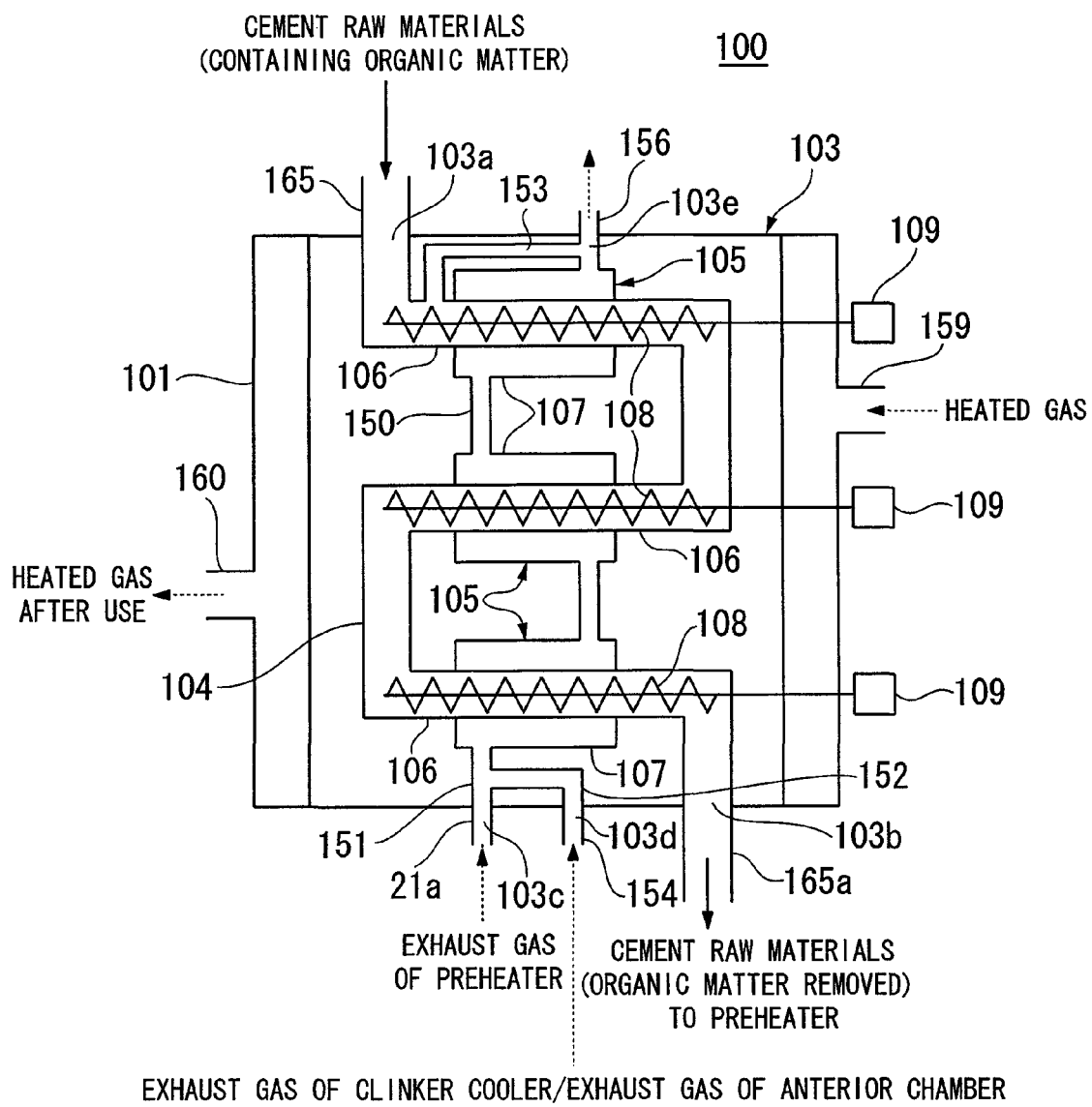
FIG. 2 is a schematic configuration diagram of an organic matter remover installed on the cement production facility given in FIG. 1.

As illustrated in FIG. 1 and FIG. 2, the organic matter remover 100 is provided with the above-described external jacket 101, a casing 103, a winding pipe 104 and heating screw-type heating portions 105. The casing 103 is formed in a rectangular shape when viewed from above. The winding pipe 104 is formed in a zigzag manner and installed in a vertical direction at an inner space of the casing 103. The winding pipe 104 connects a feeding port 103a of cement raw materials formed on the upper plate of the casing 103 with a discharge port 103b of cement raw materials formed on the lower plate of the casing 103. The downstream end of the heated raw material powder transfer facility 165 is connected to the feeding port 103a, and the upstream end of the organic matter removed powder transfer facility 165a is connected to the discharge port 103b. The upstream end of the heated raw material powder transfer facility 165 is connected to the storage silo 14, and the downstream end of the organic matter removed powder transfer facility 165a is connected to the upper part of the preheater 16.

The heating portions 105 are arranged in a three-stage manner apart from each other in a vertical direction at a halfway point of the winding pipe 104. The heating portion 105 is provided with a cylindrical delivery pipe 106, a cylindrical jacket 107, a screw 108 and a rotating motor 109. The cylindrical delivery pipe 106 is made up of a part disposed horizontally at a halfway point of the winding pipe 104. The cylindrical jacket 107 is installed so as to enclose the delivery pipe 106, thereby heating cement raw materials which pass through the delivery pipe 106. The screw 108 is accommodated inside the delivery pipe 106 and actuated by the rotating motor 109 to transfer the cement raw materials.

Each of cylindrical jackets 107 is arranged in series through one heat source delivery pipe 150, the upstream end of which branches in two directions. One upstream end of the heat source delivery pipe 150, that is, a branch pipe 151, is connected to a first heat source supply port 103c formed on the lower plate of the casing 103. The other upstream end of the heat source delivery pipe 150, that is, a branch pipe 152, is connected to a second heat source supply port 103d formed on the lower plate of the casing 103. The downstream end of the heat source delivery pipe 150 is connected to a heat source discharge port 103e formed on the upper plate of the casing 103. An organic gas separating branch pipe 153, which branches from the upstream part of the delivery pipe 106 of the uppermost stage heating portion 105, is connected to the downstream end of the heat source delivery pipe 150.

The downstream end of a preheating branched pipe 21a is connected to the first heat source supply port 103c. The upstream end of the preheating branched pipe 21a is connected to the upstream end of the exhaust gas duct 21. A fan F4 is installed at the preheating branched pipe 21a. Exhaust gas from the upper stage part of the preheater 16 is supplied via the preheating branched pipe 21a and the first heat source supply port 103c to the heat source delivery pipe 150, and sequentially supplied to the cylindrical jacket 107 at each heating portion 105. The downstream end of a heat source introducing pipe 154, the upstream end of which branches in two directions, is connected to the second heat source supply port 103d. One upstream end of the heat source introducing pipe 154, that is, a branch pipe 154a, is connected to the upper part of the anterior chamber of the rotary kiln 18. The other upstream end of the heat source introducing pipe 154, that is, a branch pipe 154b, is connected to the upper part of the clinker cooler 19. A fan F5 is installed at the heat source introducing pipe 154 connected to the second heat source supply port 103d. Exhaust gas from the clinker cooler 19 and exhaust gas from the anterior chamber of the rotary kiln 18 are supplied via the heat source introducing pipe 154 and the second heat source supply port 103d to the heat source delivery pipe 150, and sequentially supplied to the cylindrical jacket 107 at each heating portion 105.

The upstream end of an exhaust gas guiding pipe (heat-treated gas supply channel) 156 is connected to the heat source discharge port 103e. The downstream end of an exhaust gas guiding pipe 156 is connected to the lower stage part of the preheater 16 (the temperature is increased to about 850° C. at the lower stage part of the preheater 16 on normal operation). A valve 155 is installed at the exhaust gas guiding pipe 156.

The exhaust gas guiding pipe 156 which is further upstream than the valve 155, is connected via a first branched pipe (heat-treated gas supply channel) 156a to the upstream part of the clinker cooler 19 (the temperature is increased to about 1100° C. at the upstream part of the clinker cooler 19 on normal operation). A valve 157 is installed on the first branched pipe 156a. The exhaust gas guiding pipe 156, which is further upstream than the first branched pipe 156a, is connected via a second branched pipe (heat-treated gas supply channel) 156b to the end wall of the anterior chamber of a rotary kiln 18 (the temperature is increased to about 1450° C. at the anterior chamber of the rotary kiln 18 on normal operation). A valve 158 is installed on the second branched pipe 156b. A fan F6 is installed on the exhaust gas guiding pipe 156, which is further upstream than the second branched pipe 156b.

The heated gas supplying portion (not illustrated) of the gas generator 102 is connected via the heated gas supply pipe 159 to a part of the external wall of an external jacket 101. The other part of the external wall of the external jacket 101 is connected via an external heat exhaust gas pipe 160 to the exhaust gas duct 21.

The gas generator 102 is used in a case where only the heat of the exhaust gas from the above-mentioned three heat sources (the upper stage part of the preheater 16, the anterior chamber of the rotary kiln 18 and the upper part of the clinker cooler 19) has difficulty in removing organic chlorine compounds from cement raw materials. Heated gas generated by the gas generator 102 is supplied via the heated gas supply pipe 159 to an inner space of the external jacket 101 (the temperature is increased to about 300° C. inside the external jacket 101 on operation of the gas generator 102). It is noted that the exhaust gas from the upper part of the preheater 16 may be partially supplied to the external jacket 101.

As described so far, the heated gas supplied to the external jacket 101 is used on heating by each heating portion 105 to heat air inside the casing 103, thereby heating cement raw materials flowing through the winding pipe 104. The heated gas used in heating the cement raw materials is introduced via the external heat exhaust gas pipe 160 to the exhaust gas duct 21.

A description will be given of a method for reducing organic chlorine compounds which is carried out inside the cement production facility 10A (within the system) of the present embodiment.

First, three valves 155, 157 and 158 are opened. Thereafter, as illustrated in FIG. 1, cement raw materials (limestone, clay, silica stone and iron material) stored in the raw material storage shed 11 are fed via a raw material transfer facility 118 into the raw material mill 13. However, some of the cement raw materials with a high water content such as clay are fed via a raw material supply facility 131 to a raw material dryer 12. After being dried by the raw material dryer 12, they are fed via a dried raw material discharge facility 132 to the raw material mill 13. Since high-temperature exhaust gas from the upper part of the preheater 16 is introduced into the raw material dryer 12 and the raw material mill 13 via the exhaust gas duct 21, the temperature is kept at about 300° C. or higher inside the raw material dryer 12, and at 100° C. or higher inside the raw material mill 13. Therefore, the cement raw materials with a high water content, which have been supplied from the raw material storage shed 11, are dried in the raw material dryer 12. Cement raw materials including dried clay, which have been supplied from the raw material dryer 12, are heated up to about 100° C. and crushed into grains of about 90 µm or smaller by using a number of metal balls in the raw material mill 13. Cement raw materials crushed in the raw material mill 13 are fed into the storage silo 14 via a crushed raw material transfer facility 121.

Where organic chlorine compounds such as dioxins and PCBs or waste containing organic matter and chlorine (municipal waste and incinerated ash) are mixed into cement raw materials, organic chlorine compounds contained in the cement raw materials, which are fed into the raw material mill 13, are heated inside the raw material mill 13 kept at about 100° C. or higher and consequently separated from the cement raw materials. Further, organic chlorine compounds contained in the cement raw materials, which have been fed into the raw material dryer 12, are heated inside the raw material dryer 12 kept at about 300° C. or higher and decomposed (evaporated).

Since exhaust gas introduced into the raw material dryer 12 and the raw material mill 13 is deprived of heat by heating cement raw materials, the exhaust gas at the entrance of an electric dust collector 30 is decreased in temperature to about 90° C. Organic chlorine compounds separated from the cement raw materials or decomposed are substantially adsorbed by dust in the exhaust gas. Dust, which has adsorbed the organic chlorine compounds, is collected by the electric dust collector 30, in the course of being guided into the chimney 130 via the gas duct 129. The thus collected dust is fed into the storage silo 14 via the dust delivery facility 123 and the crushed raw material transfer facility 121.

Cement raw materials (containing dust) stored in the storage silo 14 are fed via a heated raw material powder transfer facility 165 into the feeding port 103a of the organic matter remover 100. In this instance, at each heating portion 105, a delivery pipe 106 is heated up to about 300° C. by exhaust gas from each of the heat sources flowing inside the cylindrical jacket 107, and a screw 108 is rotated in synchronization by the rotating motor 109. Thereby, cement raw materials fed into the organic matter remover 100 are allowed to pass sequentially through three heating portions 105 while being delivered inside the winding pipe 104, during which the organic chlorine compounds are removed, and discharged from the discharge port 103b of the organic matter remover 100. Cement raw materials discharged from the organic matter remover 100 are fed into the upper part of the preheater 16 via the organic matter removed powder transfer facility 165a.

Heat-treated gas (exhaust gas) containing organic chlorine compounds generated inside the organic matter remover 100, more specifically, inside the winding pipe 104, is introduced via the organic gas separating branch pipe 153 into the downstream end of the heat source delivery pipe 150. Thereby, heat-treated gas generated inside the winding pipe 104 is mixed with exhaust gas from each of the heat sources used in heating cement raw materials and introduced into the exhaust gas guiding pipe 156 via the heat source discharge port 103e. The thus mixed exhaust gas and heat-treated gas are supplied via the exhaust gas guiding pipe 156 to the lower stage part of the preheater 16, then supplied via the first branched pipe 156a to the upstream part of the clinker cooler 19 and further supplied via the second branched pipe 156b to the anterior chamber of the rotary kiln 18. Since the temperature is increased to 800° C. or higher at each of the above-described portions on normal operation, organic chlorine compounds which are contained in exhaust gas and heat-treated gas supplied to each of the above-described portions are thermally decomposed.

Cement raw materials, from which organic chlorine compounds have been removed in the organic matter remover 100, are supplied to the calcination processing area 2, flow down sequentially from the uppermost stage of the cyclone 15 of the preheater 16 to the lower stage of the cyclone 15 and are preheated up to about 800° C. Thereafter, the cement raw materials are fed into the posterior chamber of the rotary kiln 18. At the anterior chamber of the rotary kiln 18, cement clinker is calcinated from the cement raw materials by the heat of the burner 17. The thus calcinated cement clinker is cooled by the clinker cooler 19 and thereafter stored at the clinker silo 20.

In conventional cement production facility, cement raw materials are directly fed from a storage silo into the upper part of a preheater. In this instance, organic chlorine compounds contained in the cement raw materials are to be substantially subjected to thermal decomposition in association with the descent of the cement raw materials inside the preheater. Such thermal decomposition does not take place in reality, but the organic chlorine compounds are separated (evaporated) by the heat of the upper part of the preheater (including the heat of exhaust gas), mixed into the exhaust gas, as they are, and returned to a raw material mill and others. Thereby, the organic chlorine compounds are circulated inside a raw material processing area and gradually increased in concentration. As a result, an increase is found in the quantity of dioxins released into the atmosphere from cement production facility conducting raw material processes via the gas duct and consequently there is an increased quantity of dioxins exhausted from the cement production facility.

On the other hand, in the cement production facility 10A of the present embodiment, immediately before cement raw materials are fed into the preheater 16, they are fed into the organic matter remover 100 and heated to remove organic chlorine compounds. Thereby, the circulation of organic chlorine compounds is cut off inside the raw material processing area, inhibiting an increase in concentration of the organic chlorine compounds. As a result, it is possible to reduce the quantity of organic chlorine compounds such as dioxins and PCBs exhausted from the cement production facility 10A to a greater extent as compared with conventional facility.

A description will be given of a method for reducing organic chlorine compounds in the cement production facility 10B of the present invention and Embodiment 2 of the cement production facility by referring to FIG. 3. It is noted that constituents already described in Embodiment 1 are given the same symbols or numerals the descriptions thereof are omitted.

Figure 3:
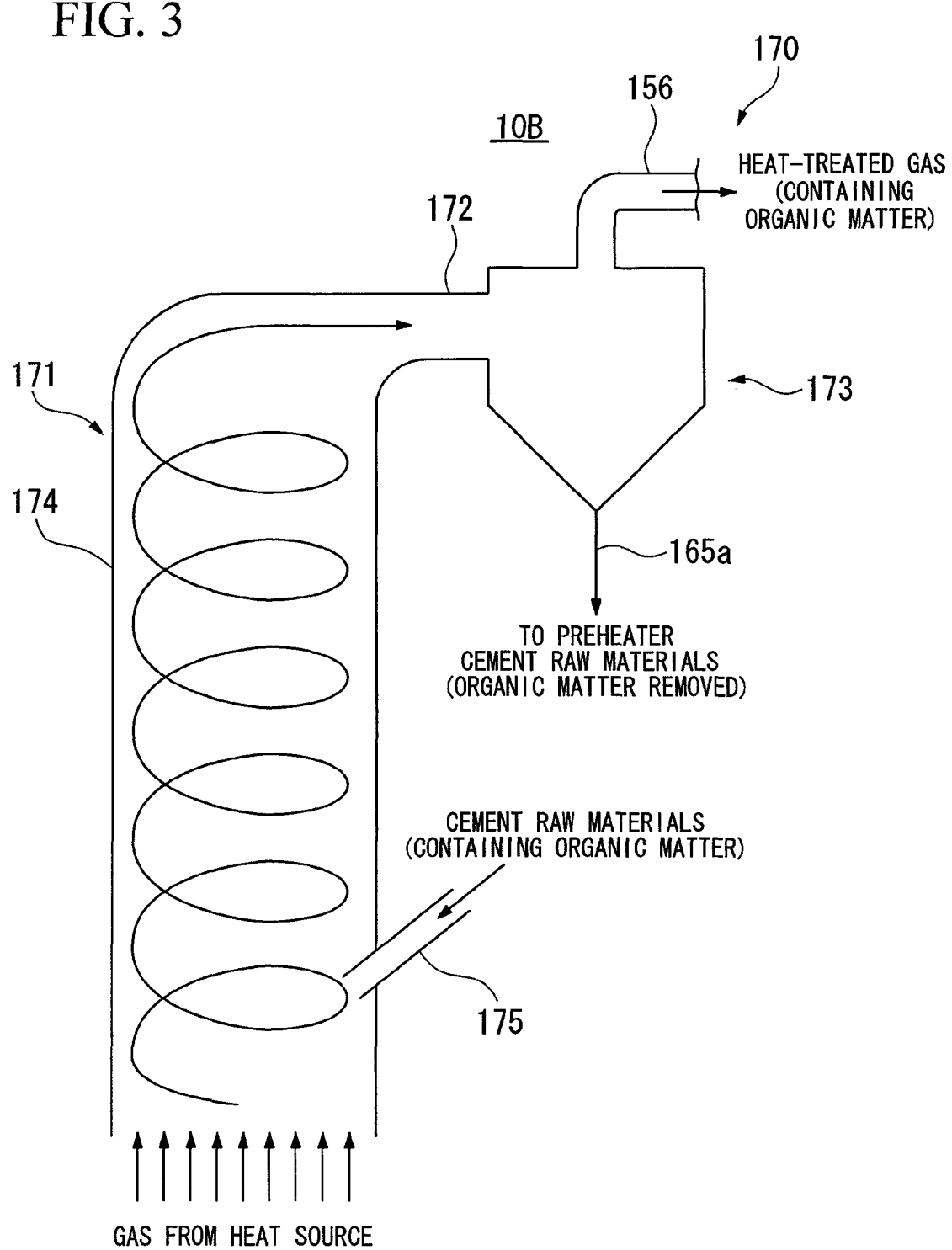
FIG. 3 is a schematic configuration diagram of an organic matter remover installed on the cement production facility for carrying out Embodiment 2 of a method for reducing the organic chlorine compounds of the present invention.

As illustrated in FIG. 3, the cement production facility 10B of the present embodiment is provided with an organic matter remover 170 in place of the organic matter remover 100 of Embodiment 1. The organic matter remover 170 is provided with a fluidized bed 171 and a cyclone 173. The fluidized bed 171 heats cement raw materials to remove organic chlorine compounds in the cement raw materials. The cyclone 173 is connected to the upper part of the fluidized bed 171 via a connecting pipe 172, taking out cement raw materials from which organic chlorine compounds have been removed from the fluidized bed 171.

The fluidized bed 171 is provided with a heating tower 174 and transfer facility 175. The heating tower 174 is formed in a vertical cylindrical shape, heating cement raw materials which contain organic chlorine compounds. The downstream end of the transfer facility 175 is connected to the lower part of the external wall of the heating tower 174. Heated raw material powder transfer facility 165 is connected to the upstream end of the transfer facility 175. Cement raw materials are fed at a constant flow rate from a storage silo 14 via the heated raw material powder transfer facility 165 and the transfer facility 175 into the heating tower 174. A porous plate (not illustrated) is installed horizontally at the bottom of the heating tower 174. Exhaust gas from the above-mentioned three heat sources (the upper stage part of the preheater 16, the upper part of the clinker cooler 19 and the anterior chamber of the rotary kiln 18) is supplied into the heating tower 174 continuously at a constant pressure through individual holes of the porous plate.

Since exhaust gas supplied inside the heating tower 174 is blown upward, cement raw materials fed into the heating tower 174 via the transfer facility 175 ascend while swirling inside the heating tower 174. In the course of the ascent, organic chlorine compounds are separated from cement raw materials or thermally decomposed by the heat of the exhaust gas. Thereafter, heat-treated gas containing organic chlorine compounds and cement raw materials, from which organic chlorine compounds have been removed, are supplied to the cyclone 173 via the connecting pipe 172.

Heat-treated gas, which contains organic chlorine compounds supplied to the cyclone 173, is separated from cement raw materials and supplied to the lower stage part of the preheater 16, the anterior chamber of the rotary kiln 18 and the upstream part of the clinker cooler 19 respectively via an exhaust gas guiding pipe 156, a first branched pipe 156a and a second branched pipe 156b. Since the temperature is increased to 800° C. or higher at all the above-described parts on normal operation, organic chlorine compounds contained in the exhaust gas and heat-treated gas supplied to these parts are thermally decomposed. On the other hand, cement raw materials, from which organic chlorine compounds have been removed, are fed from the bottom of the cyclone 173 into the upper part of the preheater 16 via the organic matter removed powder transfer facility 165a.

In the cement production facility 10B of the present embodiment, the organic matter remover 170 is simpler in structure than the organic matter remover 100 and easy in terms of maintenance. Since other constitutions, actions and effects are the same as those of Embodiment 1, the descriptions thereof are omitted.

Operation of the cement production facility 10B of the Embodiment 1 was compared with that of a conventional cement production facility to study the reduction rate of PCBs in exhaust gas released into the atmosphere. As a result, the content of PCBs in the fed raw materials was reduced to 10 ng/g as compared with 500 ng/g found on operation of the conventional facility. Further, the content of PCBs in dust-removed gas was reduced to 250 ng/Nm$^3$ as compared with 10000 ng/Nm$^3$ found in the conventional facility.

A description will be given of a method for reducing organic chlorine compounds in the cement production facility of the present invention and Embodiment 3 of the cement production facility by referring to FIG. 4. It is noted that constituents already described in Embodiment 1 are given the same symbols or numerals, the descriptions thereof are omitted.

Figure 4:
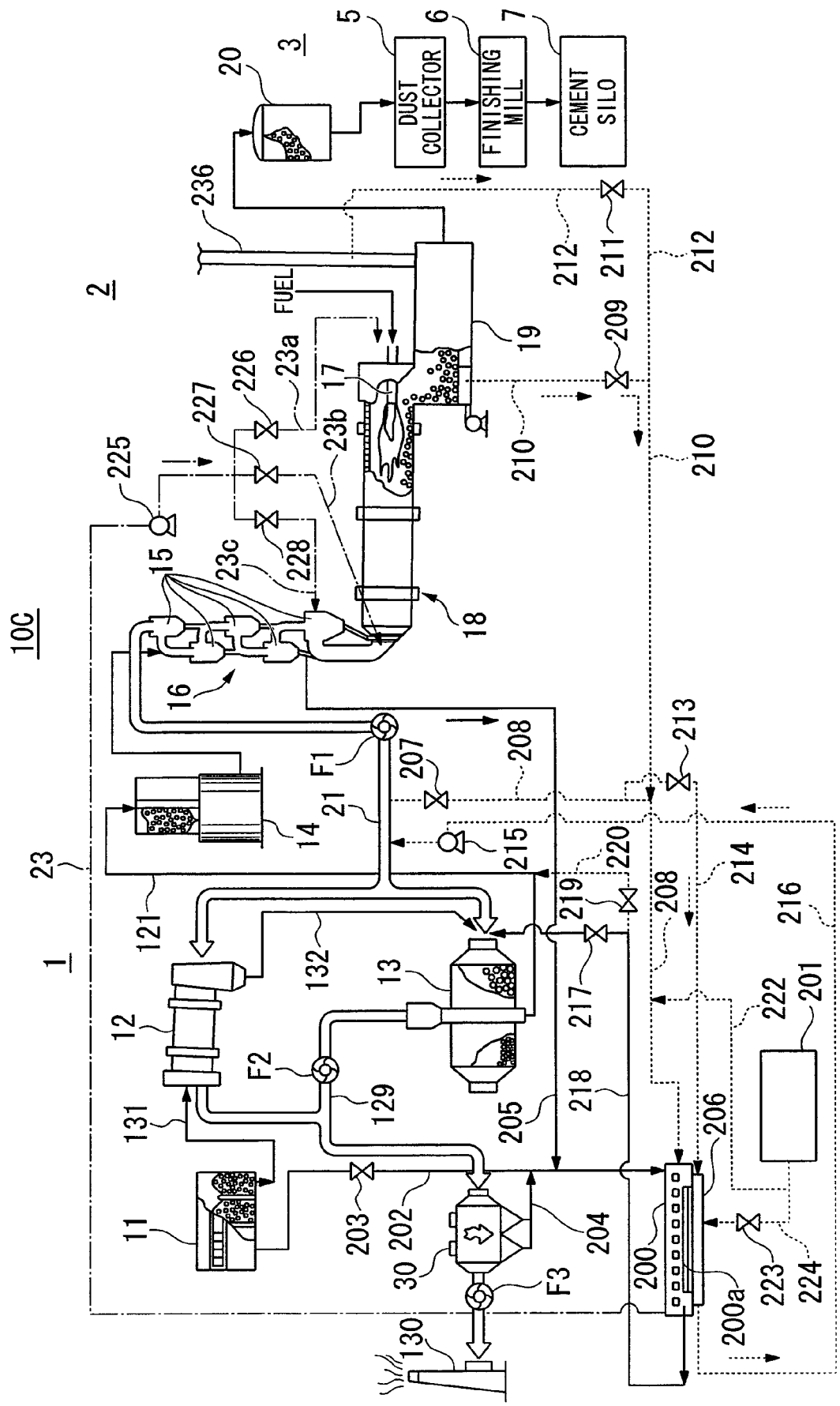
FIG. 4 is a schematic configuration diagram of cement production facility for carrying out Embodiment 3 of a method for reducing the organic chlorine compounds of the present invention.

As illustrated in FIG. 4, the cement production facility 10C of the present embodiment are provided with a raw material processing area 1 for crushing cement raw materials, a calcination processing area 2 for calcinating the thus crushed cement raw materials and a finish processing area 3 for mixing the thus calcinated cement clinker with gypsum and crushing the resultant.

The raw material processing area 1 is provided with a raw material storage shed 11, a raw material dryer 12, a raw material mill 13, an electric dust collector (dust collector) 30, a storage silo 14, a preliminary heater (a second preliminary heater) 200 and a heat generator 201. The preliminary heater 200 is a heating screw-type heater and heats cement raw materials containing organic chlorine compounds. The heat generator 201 is actuated when the preliminary heater 200 alone is unable to provide sufficient heat for preliminarily heating cement raw materials.

The raw material storage shed 11 is connected via a raw material supply facility 202 to the preliminary heater 200. A valve 203 is installed at the raw material supply facility 202. Cement raw materials stored in the raw material storage shed 11 are supplied via the raw material supply facility 202 to the preliminary heater 200.

The electric dust collector 30 is connected via the dust delivery facility 204 to the raw material supply facility 202, which are further downstream than the valve 203. Dust collected by the electric dust collector 30 is supplied via the dust delivery facility 204 and the raw material supply facility 202 to the preliminary heater 200. The lower stage part of the preheater 16 is connected via a heated raw material delivery pipe 205 to the raw material supply facility 202, which are further downstream than the valve 203. In order to reduce organic chlorine compounds contained in cement raw materials heated by the preheater 16, some of the heated cement raw materials are extracted from the vicinity of the lower stage part of the preheater 16 and supplied via the heated raw material delivery pipe 205 and the raw material supply facility 202 to the preliminary heater 200.

The preliminary heater 200 preliminarily heats cement raw materials supplied from the raw material storage shed 11 via the raw material supply facility 202 and dust supplied from the electric dust collector 30 via the dust delivery facility 204 and the raw material supply facility 202 in the course of transferring them in association with rotation of the screw 200a.

A jacket 206 is installed outside the preliminary heater 200. The jacket 206 preliminarily heats cement raw materials indirectly from the outside of the preliminary heater 200. Exhaust gas generated at various places of the cement production facility 10C is supplied as the heat source to the jacket 206. It is noted that the cement raw materials are preliminarily heated at 250° C. for about 20 minutes by the preliminary heater 200 on normal operation.

The heat source of the preliminary heater 200 includes exhaust gas (about 300° C.) supplied from the upper part of the preheater 16 via the exhaust gas duct 21 to the raw material dryer 12 and the raw material mill 13, exhaust gas (300° C. or higher) from the clinker cooler 19 and exhaust gas (about 200° C. to 300° C.) from the clinker cooler 19 via the gas duct 236.

The exhaust gas duct 21, which is further downstream than the fan F1, is connected via a first heating medium pipe 208 to the preliminary heater 200. The first heating medium pipe 208 is provided with a valve 207. Exhaust gas from the preheater 16 is partially supplied via the first heating medium pipe 208 to the preliminary heater 200. The clinker cooler 19 is connected via a second heating medium pipe 210 to the first heating medium pipe 208. The second heating medium pipe 210 is provided with a valve 209. Exhaust gas from the clinker cooler 19 is partially supplied via the second heating medium pipe 210 and the first heating medium pipe 208 to the preliminary heater 200. The gas duct 236 is connected via a third heating medium pipe 212 to the second heating medium pipe 210. The third heating medium pipe 212 is provided with a valve 211. Exhaust gas discharged from the clinker cooler 19 via the gas duct 236 is partially supplied via the third heating medium pipe 212, the second heating medium pipe 210 and the first heating medium pipe 208 to the preliminary heater 200.

The first heating medium pipe 208, which is further downstream than the valve 207, is connected via the branched pipe 214 to the jacket 206 of the preliminary heater 200. The branched pipe 214 is provided with a valve 213. There is a case where exhaust gas supplied from the preheater 16 to the raw material mill 13 and others is lower in oxygen concentration and not suitable as heating gas associated with combustion. In this case, the valve 213 is opened, and exhaust gas from the preheater 16 is supplied via the branched pipe 214 to the jacket 206 to indirectly heat cement raw materials and others.

The preliminary heater 200 is connected via the jacket discharge pipe 216 to the exhaust gas duct 21, which is further downstream than a connecting part with the first heating medium pipe 208. A fan 215 for transferring exhaust gas is installed on the jacket discharge pipe 216. Exhaust gas discharged from the jacket 206 after being used for heating cement raw materials and others is returned via the jacket discharge pipe 216 to the exhaust gas duct 21. Thereby, some of the organic chlorine compounds contained in exhaust gas resulting from the preheater 16 are heat-treated in raw material processes (the raw material dryer 12 and the raw material mill 13) of cement production.

The preliminary heater 200 is connected via the raw material discharge pipe 218 to the raw material mill 13. A valve 217 is installed on the raw material discharge pipe 218. Cement raw materials and dust preliminarily heated by the preliminary heater 200 are fed via the raw material discharge pipe 218 into the raw material mill 13. The raw material discharge pipe 218, which is further upstream than the valve 217, is connected via a dust exclusive piping 220 to the crushed raw material transfer facility 121. A valve 219 is installed on the dust exclusive piping 220. When the cement production facility 10C is operated at night, the valves 203 and 217 are closed and the valve 219 is opened, by which only dust is supplied to the preliminary heater 200. Thereby, organic chlorine compounds are separated from dust or decomposed. Dust, from which organic chlorine compounds have been removed, is fed into the storage silo 14 via the raw material discharge pipe 218, the dust exclusive piping 220 and the crushed raw material transfer facility 121.

The heat generator 201 is actuated in a case where the above-mentioned three heat sources alone are unable to provide sufficient heat for preliminarily heating cement raw materials, thereby supplementing an insufficient heat of the preliminary heater 200. More specifically, a hot gas generator-type heating unit is adopted for this purpose.

The heat generator 201 is connected via a supplementary heat delivery pipe 222 to the first heating medium pipe 208, which is further downstream than the valve 207. The supplementary heat delivery pipe 222 is connected via a supplementary heat branched pipe 224 to the jacket 206 of the preliminary heater 200. A valve 223 is installed on the supplementary heat branched pipe 224. On normal operation, heated air (about 400° C.) generated by the heat generator 201 is supplied via the supplementary heat delivery pipe 222 and the first heating medium pipe 208 to the preliminary heater 200. Where it is necessary to supplement insufficient heat of the preliminary heater 200, the valve 223 is opened to supply the heated air generated by the heat generator 201 via the supplementary heat delivery pipe 222 and the supplementary heat branched pipe 224 to the jacket 206.

The preliminary heater 200 is connected via a gas delivery pipe 23 to the lower stage part of the preheater 16, the posterior chamber of the rotary kiln 18 and the anterior chamber of the rotary kiln 18. A fan 225 is installed on the gas delivery pipe 23. The gas delivery pipe 23 is branched into three directions at the downstream end. Of these three branched pipes, a first branched pipe 23a is connected to the anterior chamber of a rotary kiln 18, a second branched pipe 23b is connected to the posterior chamber of the rotary kiln 18, and a third branched pipe 23c is connected to the lowermost stage (the fifth one) of the cyclone 15 of the preheater 16. On preliminarily heating dust-containing cement raw materials, heat-treated gas (exhaust gas) containing organic chlorine compounds generated in the preliminary heater 200 is supplied via the gas delivery pipe 23 respectively to the lower stage part of the preheater 16, the posterior chamber of the rotary kiln 18 and the anterior chamber of the rotary kiln 18. It is noted that where the cement production facility 10C are provided with a calcinator, the above-described heat-treated gas may be supplied to the calcinator. Further, the heat-treated gas may be supplied to the upstream part of the clinker cooler 19.

The first branched pipe 23a is provided with a first valve 226, the second branched pipe 23b is provided with a second valve 227, and the third branched pipe 23c is provided with a third valve 228. The first valve 226, the second valve 227 and the third valve 228 are opened and closed, thereby making it possible to supply the heat-treated gas to at least one of the lower stage part of the preheater 16, the posterior chamber of the rotary kiln 18 and the anterior chamber of the rotary kiln 18.

The calcination processing area 2 is provided with a preheater 16, a burner 17, a rotary kiln 18, a clinker cooler 19, a clinker silo 20 and a dust collector 5. The dust collector 5 collects dust which contains organic chlorine compounds discharged from the clinker silo 20.

The finish processing area 3 is provided with a finishing mill 6 and a cement silo 7. The finishing mill 6 crushes cement clinker, to which gypsum is added in a predetermined quantity, providing cement as a final product. The cement silo 7 stores the thus provided cement.

A description will be given of a method for reducing organic chlorine compounds conducted inside the cement production facility 10C (within the system) of the present embodiment.

First, three values 213, 219 and 223 are closed, while other valves are opened. As illustrated in FIG. 4, cement raw materials (limestone, clay, silica stone and iron material) stored in the raw material storage shed 11 are supplied via the raw material supply facility 202 to the preliminary heater 200. However, some of the cement raw materials with a high water content such as clay are fed via the raw material supply facility 131 to the raw material dryer 12 and fed via the dried raw material discharge facility 132 to the raw material mill 13 after being dried by the raw material dryer 12.

Since high-temperature exhaust gas from the upper part of the preheater 16 is introduced into the raw material dryer 12 via the exhaust gas duct 21, the temperature inside the raw material dryer 12 is kept at 300° C. or higher. Where organic chlorine compounds such as dioxins and PCBs or waste containing organic matter and chlorine (municipal waste and incinerated ash) are mixed into cement raw materials, organic chlorine compounds contained in the cement raw materials fed into the raw material dryer 12 are heated inside the raw material dryer 12 and then decomposed (evaporated).

Since exhaust gas introduced into the raw material dryer 12 is deprived of heat by heating the cement raw materials, the exhaust gas at the entrance of an electric dust collector 30 is decreased in temperature to about 90° C. Decomposed organic chlorine compounds are substantially adsorbed by dust in the exhaust gas. Dust, which has adsorbed the organic chlorine compounds, is collected by the electric dust collector 30, in the course of being guided into the chimney 130 via the gas duct 129. The thus collected dust is introduced into the preliminary heater 200 via the dust delivery facility 204 and the raw material supply facility 202. In addition, some of the cement raw materials extracted from the vicinity of the lowermost part of the preheater 16 are introduced into the preliminary heater 200 via the heated raw material delivery pipe 205 and the raw material supply facility 202. Since the cement raw materials are heated up to about 800° C. by the preheater, they can be used as a heat source for the preliminary heater 200.

The cement raw materials and dust supplied inside the preliminary heater 200 (hereinafter, simply referred to as cement raw materials) are preliminarily heated gradually up to about 400° C. while being transferred in association with the rotation of a screw 200a. The preliminary heating takes about 10 minutes. Separation of precursors of dioxins (such as benzene, phenol, chlorobenzene and chlorophenol) from cement raw materials requires heating of cement raw materials up to 200° C. or higher, and thermal decomposition of the precursors requires heating of the cement raw materials up to 800° C. or higher. Further, separation of PCBs from the cement raw materials requires heating of the cement raw materials up to 100° C. or higher and thermal decomposition of PCBs requires heating of the cement raw materials up to 800° C. or higher. In order to separate odorous components (such as acetaldehyde) from the cement raw materials, it is necessary to heat the cement raw materials up to 50° C. or higher. Therefore, cement raw materials before being crushed by the raw material mill 13 are preliminarily heated by the preliminary heater 200 up to about 250° C., thereby precursors of dioxins and odorous components are separated from the cement raw materials.

The preliminary heater 200 is supplied with exhaust gas (about 300° C.) from the upper part of the preheater 16, exhaust gas (300° C. or higher) from the clinker cooler 19 and exhaust gas (about 200° C. to 300° C.) discharged from the clinker cooler 19 via the gas duct 236 as a heat source. Further, whenever necessary, the valve 213 is opened to partially supply exhaust gas from the upper part of the preheater 16 to the jacket 206. As a result, cement raw materials fed from the preliminary heater 200 are heated not only from inside the preliminary heater 200 but also from the outside thereof. Where sufficient heat is not provided even thereafter, heated air generated in the heat generator 201 is supplied via the supplementary heat delivery pipe 222 and the first heating medium pipe 208 to the preliminary heater 200. There is also a case where the valve 223 is opened to supply the heated air generated in the heat generator 201 to the jacket 206. Thereby, it is possible to supplement the heat necessary for the preliminary heater 200. In the preliminary heater 200, cement raw materials, from which organic chlorine compounds have been removed, are fed via the raw material discharge pipe 218 into the raw material mill 13.

Since high-temperature exhaust gas from the upper part of the preheater 16 is introduced via the exhaust gas duct 21 to the raw material mill 13, the temperature inside the raw material mill 13 is kept at 100° C. or higher. Therefore, in the raw material mill 13, cement raw materials which contain dried clay supplied from the raw material dryer 12 are heated up to about 100° C. and also crushed into grains of about 90 μm or smaller by a number of metal balls. The thus crushed cement raw materials are fed via the crushed raw material transfer facility 121 into the storage silo 14.

Where organic chlorine compounds such as dioxins and PCBs or waste containing organic matter and chlorine (municipal waste and incinerated ash) are mixed into cement raw materials, organic chlorine compounds contained in the cement raw materials, which are fed into the raw material mill 13, are heated inside the raw material mill 13, kept at about 100° C. or higher, and consequently separated from the cement raw materials.

Since exhaust gas introduced into the raw material mill 13 is deprived of heat by heating cement raw materials, the exhaust gas at the entrance of an electric dust collector 30 is decreased in temperature to about 90° C. Therefore, organic chlorine compounds separated from the cement raw materials are substantially adsorbed by dust in the exhaust gas. Dust, which has adsorbed the organic chlorine compounds, is collected by the electric dust collector 30, in the course of being guided into the chimney 130 via the gas duct 129. The thus collected dust is introduced into the preliminary heater 200 via the dust delivery facility 204 and the raw material supply facility 202.

Heat-treated gas, which contains organic chlorine compounds generated in a preliminary heating step, is supplied via the gas delivery pipe 23 to at least one of the lower stage part of the preheater 16, the posterior chamber of the rotary kiln 18 and the anterior chamber of the rotary kiln 18.

Where heat-treated gas containing organic chlorine compounds is supplied to the posterior chamber of the rotary kiln 18, heating is conducted inside the rotary kiln 18 by a burner 17 up to 1100° C. to 1450° C., which exceeds a temperature at which dioxins are thermally decomposed. Further, since a kiln shell is rotated at a low speed of 1 to 3 rpm in a circumferential direction, heat-treated gas, which contains organic chlorine compounds supplied to the posterior chamber of the rotary kiln 18, is heated inside the rotary kiln 18 for 30 minutes or longer. Thereby, cement clinker is calcinated and also all the organic chlorine compounds contained in the heat-treated gas are thermally decomposed and rendered harmless.

Where heat-treated gas, which contains organic chlorine compounds, is supplied to the anterior chamber of the rotary kiln 18, the heat-treated gas is used as air for combustion in the burner 17. Thereby, organic chlorine compounds in the heat-treated gas are subjected to complete thermal decomposition.

Where heat-treated gas, which contains organic chlorine compounds, is supplied to the lowermost stage of the cyclone 15 of the preheater 16, the heat-treated gas is used as air for heating cement raw materials until limestone therein is decarbonated. The organic chlorine compounds are completely subjected to thermal decomposition in the course of heating the cement raw materials.

When the cement production facility 10C are operated at night, the valves 203 and 217 are closed and the valve 219 is opened, by which only dust is supplied to the preliminary heater 200. Thereby, organic chlorine compounds are separated from dust or decomposed. The dust, from which organic chlorine compounds have been removed, is stored in the storage silo 14 via the raw material discharge pipe 218, the dust exclusive piping 220 and the crushed raw material transfer facility 121.

Cement raw materials stored in the storage silo 14 are supplied to the calcination processing area 2, flowing down sequentially from the uppermost stage of the cyclone 15 of the preheater 16 to the lower stage of the cyclone 15 and preheated up to about 800° C. Thereafter, the cement raw materials are fed into the posterior chamber of the rotary kiln 18. At the anterior chamber of the rotary kiln 18, cement clinker is calcinated from the cement raw materials by the heat of the burner 17. The thus calcinated cement clinker is cooled by the clinker cooler 19 and thereafter stored in the clinker silo 20.

Cement clinker stored in the clinker silo 20 is supplied to a finishing mill 6 after addition of gypsum in a predetermined quantity. In the finishing mill 6, as with the raw material mill 13, the cement clinker is crushed by using a number of metal balls, providing cement as a final product. The thus provided cement is stored in a cement silo (not illustrated either) and ready for shipment.

In conventional cement production facility, cement raw materials are fed from a raw material storage shed 11 to a raw material dryer and a raw material mill without preliminary heating. Therefore, dust in exhaust gas from the raw material dryer and the raw material mill contains an abundance of organic chlorine compounds such as dioxins, PCBs and odorous components. Dust in the exhaust gas is collected by a dust collector, transferred to a storage silo and incorporated into a part of the cement raw materials. Dust-containing cement raw materials stored in the storage silo are supplied to a preheater and heated. Some of the dust-containing cement raw materials are extracted from the upper part of the preheater together with exhaust gas and returned via the exhaust gas duct to the raw material dryer and the raw material mill. Thereby, the organic chlorine compounds are circulated in the raw material processing area and gradually increased in concentration. As a result, an increased quantity of dioxins is released into the atmosphere from facility conducting raw material processes via the gas duct and consequently an increased quantity of dioxins is exhausted from cement production facility. Further, dust-removed gas, which has passed through a dust collector, still contains dioxins, PCBs and organic sludge such as odorous components although in a small quantity. There is a concern that dust-removed gas containing these substances may be released into the atmosphere from chimneys via gas ducts.

On the other hand, in the cement production facility 10C of the present embodiment, immediately before cement raw materials are fed into the raw material mill 13, they are heated by the preliminary heater 200 to remove dioxins, PCBs and odorous components. Thereby, the circulation of organic chlorine compounds is cut off inside the raw material processing area, inhibiting an increase in concentration of the organic chlorine compounds. As a result, it is possible to reduce the quantity of organic chlorine compounds such as dioxins, PCBs and odorous components exhausted from the cement production facility 10C to a greater extent as compared with conventional facility.

Figure 5:
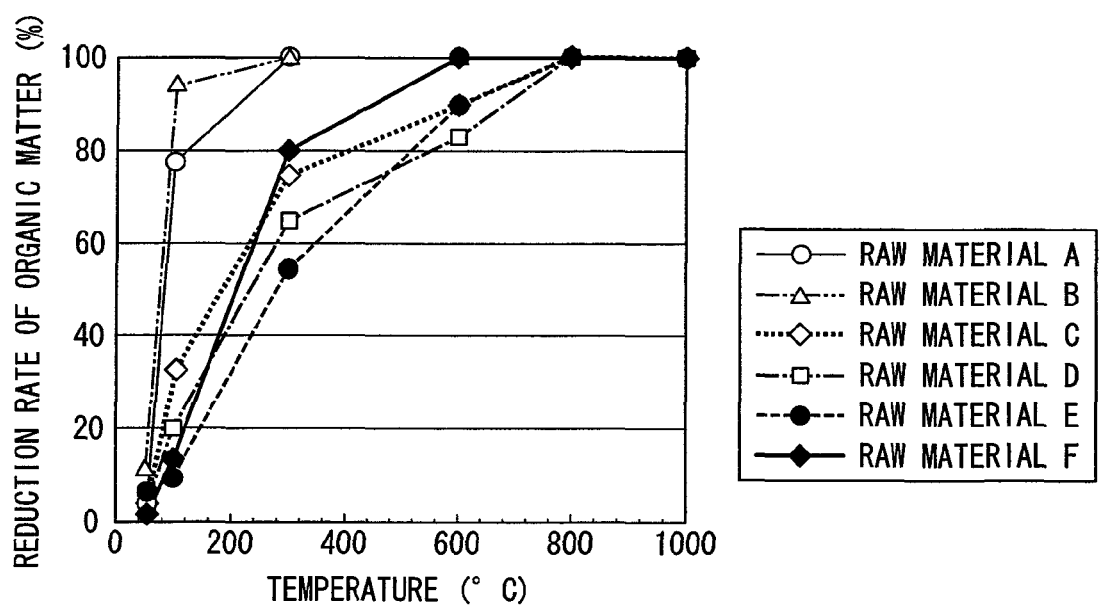
FIG. 5 is a graph for showing the relationship between temperatures inside the cement production facility and reduction rates of organic matter contained in dust.

A heating temperature by the preliminary heater 200 may be, for example, at 100° C. or higher. Where the heating temperature is at 100° C. or higher, organic chlorine compounds (including odorous components) contained in cement raw materials and dust are evaporated and then separated from the cement raw materials and the dust. FIG. 5 is a graph illustrating the relationship between temperatures inside cement production facility and reduction rates of organic matter contained in dust. In FIG. 5, Raw Material A is a soil sample obtained at an old oil refinery site, Raw Material B is a soil sample obtained at an old gas station site, Raw Material C is a sludge sample obtained at a chemical plant, Raw Material D is a sample of cinder containing soil, Raw Material E is a sample of white clay waste, Raw Material F is a sludge sample obtained at a chemical plant. Organic chlorine compounds contained in any of these raw materials are evaporated at a temperature of about 50° C. and separated from cement raw materials and dust.

However, where organic chlorine compounds are PCBs, it is preferable to heat them in a range of 500° C. to 800° C. for attaining a sufficient separation from cement raw materials and dust. When a PCB residual rate without heating dust is, for example, given as 100%, the relationship between the heating temperature and the PCB residual rate is indicated in such a way that the rate is 25% at the heating temperature of 300° C.; 5% at 500° C.; and 5% at 800° C. Dust, from which organic chlorine compounds have been removed, can be thereafter collected by a dust collector (not illustrated) connected to the downstream part of a transport unit and reused as a cement raw material.

As described so far, since cement raw materials and dust which contain organic chlorine compounds are preliminarily heated by the preliminary heater 200 before being fed into the raw material mill 13, organic chlorine compounds are separated from cement raw materials and dust or decomposed before dioxins, PCBs and others are synthesized from the organic chlorine compounds in cement raw materials and dust by heat treatment given when cement raw materials are crushed in the raw material mill 13. Further, the organic chlorine compounds separated from the cement raw materials and dust are fed into a high temperature part of the cement production facility 10C at which the temperature is increased to 800° C. or higher on normal operation and thermally decomposed. As a result, it is possible to reduce the quantity of organic chlorine compounds such as dioxins and PCBs exhausted from the cement production facility to a greater extent than conventional facility.

In a conventional case (for example, the invention disclosed in Patent Document 1), since dust is fed into a high temperature part inside cement production facility at which the temperature is increased to 800° C. or higher on normal operation, the thus obtained cement is contaminated with foreign matter (dust) and the quality of cement is decreased. Further, in a calcination process, it is necessary to conduct a complicated temperature control of cement raw materials depending on the quantity of dust to be fed. On the other hand, in the cement production facility 10C of the present embodiment, since dust is mixed into cement raw materials prior to a raw material process, it is possible to reduce disadvantages such as decreased quality of cement in the course of cement production and temperature control of cement raw materials necessary in the calcination process.

The cement production facility 10C of the present embodiment were operated to study the change with the lapse of time in concentration of PCBs in dust collected by an electric dust collector 30 and the change with the lapse of time in concentration of PCBs in dust-removed gas (gas components passed through the electric dust collector 30).

TABLE 1

| Number of operation days | Concentration of PCBs in dust (ng/g) | Concentration of PCBs in exhaust gas (ng/m$^3$N) |
|---|---|---|
| 0 | 250 | 5000 |
| 7 | 170 | 3500 |
| 14 | 80 | 1200 |
| 21 | 30 | 300 |

As apparent from Table 1, the concentration of PCBs in dust and that of PCBs in dust-removed gas were decreased with an increased number of operation days in the cement production facility 10C.

Conventionally, PCBs generated on combustion are collected in a trace amount by an electric dust collector in a state of being attached to dust. The dust is reused as a cement raw material, by which PCBs are circulated within the system of cement production facility. As a result, PCBs in exhaust gas are increased in concentration in the system of cement production facility, exhaust gas high in PCB concentration passes through an electric dust collector 30 and released into the atmosphere from chimneys through gas ducts.

According to the cement production facility 10C of the present embodiment, an increase in concentration of PCBs in exhaust gas as described above can be cut by using the preliminary heater 200 to preliminarily heat cement raw materials and dust and to evaporate the PCBs. Further, heat-treated gas containing PCBs generated on preliminary heating is used as air for combustion in the burner 17. Thereby, it is possible to reduce the concentration of PCBs in exhaust gas, which are released into the atmosphere from the cement production facility 10.

Further, operation of the cement production facility 10C of the present embodiment was compared with that of conventional cement production facility to study the reduction rate of organic chlorine compounds in exhaust gas released into the atmosphere (at the time of basic unit for usage of heated raw material: 50 kg/t.cli). As a result, THC (total organic gas), dioxins, PCBs and benzene were reduced respectively by 72%, 85%, 96% and 76% as compared with those found in the conventional facility.

A description will be given of a method for reducing organic chlorine compounds in the cement production facility of the present invention and Embodiment 4 of the cement production facility by referring to FIG. 6. It is noted that constituents already described in Embodiment 1 are given the same symbols or numerals, the descriptions thereof are omitted.

Figure 6:
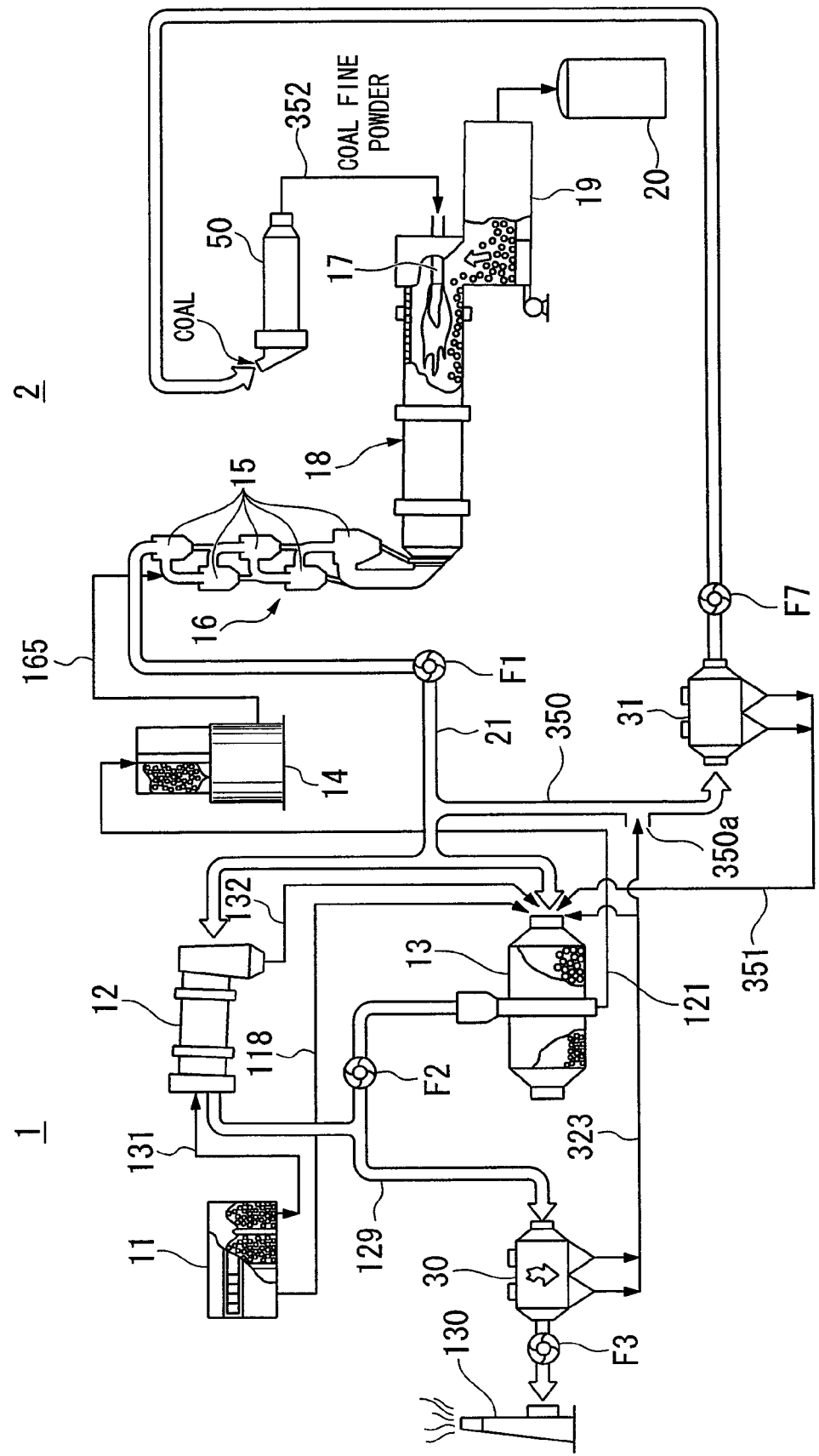
FIG. 6 is a schematic configuration diagram of cement production facility for carrying out Embodiment 4 of a method for reducing the organic chlorine compounds of the present invention.

As illustrated in FIG. 6, the cement production facility 10D of the present embodiment are provided with a raw material processing area 1 for crushing cement raw materials and a calcination processing area 2 for calcinating the thus crushed cement raw materials.

The raw material processing area 1 is provided with a raw material storage shed 11, a raw material dryer 12, a raw material mill 13, a storage silo 14 and a first electric dust collector (dust collector) 30. The storage silo 14 is connected via heated raw material powder transfer facility 165 to a preheater 16. Cement raw materials stored in the storage silo 14 are supplied via the heated raw material powder transfer facility 165 to the preheater 16. The first electric dust collector 30 is installed downstream of a gas duct 129. The first electric dust collector 30 is connected via dust delivery facility (a powder supply channel) 32 to the raw material mill 13 and an exhaust gas branched pipe (a high-temperature gas supply channel) 350 to be described later. The exhaust gas branched pipe 350 is provided with a dust feeding port 350a. Dust collected by the first electric dust collector 30 is partially fed via the dust delivery facility 323 from the dust feeding port 350a into the exhaust gas branched pipe 350, and the remaining dust is fed via the dust delivery facility 323 into the raw material mill 13.

The calcination processing area 2 is provided with a preheater 16, a burner 17, a rotary kiln 18, a clinker cooler 19, a clinker silo 20, a coal mill 50 and a dust collector (not illustrated) for collecting dust discharged from a clinker silo. The coal mill 50 crushes coal to obtain coal fine powder as a fuel of the burner 17. The dust collector collects dust discharged from the clinker silo.

The preheater 16 is provided with a multi-stage cyclone 15, the inside of which is kept higher in temperature at a lower stage (downstream), thus preheating cement raw materials from which organic chlorine compounds have been removed by an organic matter remover 100. The upstream end of an exhaust gas duct 21 is connected to the upper part of the preheater 16. The exhaust gas duct 21, which is further upstream than the branched downstream end, is connected via an exhaust gas branched pipe 350 to the coal feeding port of the coal mill 50. The exhaust gas branched pipe 350, which is further downstream than a dust feeding port 350a, is provided with a second electric dust collector (collecting device) 31 and a fan F7. The second electric dust collector 31 is connected via an organic matter removed dust pipe 351 to the raw material mill 13.

The fan F7 is installed further downstream than the second electric dust collector 31. The fan F7 is actuated, by which high-temperature exhaust gas flowing through the exhaust gas duct 21 partially flows into the exhaust gas branched pipe 350, and dust, which contains organic chlorine compounds collected by the first electric dust collector 30, flows from the dust feeding port 350a into the exhaust gas branched pipe 350. Dust, which flows from the first electric dust collector 30 via the dust delivery facility 323 and then flows from the dust feeding port 350a into the exhaust gas branched pipe 350, comes into contact with exhaust gas at a temperature of 300° C. or higher discharged from the upper part of the preheater 16. Thereby, organic chlorine compounds contained in the dust are separated from the dust or decomposed. Further, gas containing organic chlorine compounds, which have passed through the second electric dust collector 31, flow into the coal mill 50. Dust collected by the second electric dust collector 31 is supplied via the organic matter removed dust pipe 351 to the raw material mill 13.

A number of metal balls are accommodated in a rotating drum of the coal mill 50. Gas and coal containing organic chlorine compounds, which have passed through the second electric dust collector 31, are continuously fed into the rotating drum, with the rotating drum being rotated, thereby coal is finely crushed by these metal balls to obtain coal fine powder (adsorbing powder) on which organic chlorine compounds have been adsorbed. The coal fine powder is continuously fed via a powdered coal delivery pipe 352 to the burner 17. The coal fine powder is fed from the fuel feeding port in a quantity of 500 g to 900 g per 1 $m^2$ of gas. It is noted that activated carbon fine powder or oil coke fine powder may be used in place of the coal fine powder.

A description will be given of a method for reducing organic chlorine compounds which is conducted inside the cement production facility 10D of the present embodiment (within the system).

The cement raw materials (limestone, clay, silica stone and iron material) stored in the raw material storage shed 11 are fed via raw material transfer facility 118 to the raw material mill 13. However, some of the cement raw materials with a high water content such as clay are fed via raw material supply facility 131 to the raw material dryer 12, dried by the raw material dryer 12, and thereafter fed via dried raw material discharge facility 132 to the raw material mill 13. Since high-temperature exhaust gas from the upper part of the preheater 16 is introduced via the exhaust gas duct 21 into the raw material dryer 12 and the raw material mill 13, the raw material dryer 12 and the raw material mill 13 are kept thereinside respectively at about 300° C. or higher and 100° C. or higher. Therefore, in the raw material mill 13, cement raw materials containing dried clay, which has been supplied from the raw material dryer 12, is heated up to about 75° C. and crushed into grains of about 10 μm to about 30 μm on average by a number of metal balls. The thus crushed cement raw materials are fed via the crushed raw material transfer facility 121 to the storage silo 14.

The cement raw materials stored in the storage silo 14 are supplied to the calcination processing area 2 and preheated up to about 800° C. in the course of flowing down sequentially from the uppermost stage of the cyclone 15 of the preheater 16 to the lower stage of the cyclone 15. Thereafter, the cement raw materials are fed into the posterior chamber of the rotary kiln 18.

Where organic chlorine compounds such as dioxins and PCBs or waste containing organic matter and chlorine (municipal waste and incinerated ash) are mixed into cement raw materials, organic chlorine compounds contained in the cement raw materials, which have been fed into the raw material mill 13, are heated inside the raw material mill 13 kept at about 100° C. or higher and consequently separated from the cement raw materials. Further, organic chlorine compounds contained in the cement raw materials, which have been fed into the raw material dryer 12, are heated inside the raw material dryer 12 kept at about 300° C. or higher and decomposed (evaporated).

Since exhaust gas introduced into the raw material dryer 12 and the raw material mill 13 is deprived of heat by heating cement raw materials, the exhaust gas at the entrance of an electric dust collector 30 is decreased in temperature to about 90° C. Therefore, organic chlorine compounds separated from the cement raw materials or decomposed are substantially adsorbed by dust in the exhaust gas. Dust, which has adsorbed the organic chlorine compounds, is collected by the first electric dust collector 30, in the course of being guided into the chimney 130 via the gas duct 129. The thus collected dust is partially fed via the dust delivery facility 323 from the dust feeding port 350a into the exhaust gas branched pipe 350, and the remaining dust is fed via the dust delivery facility 323 into the raw material mill 13.

Organic chlorine compound-containing dust, which has been fed into the exhaust gas branched pipe 350, comes into contact with exhaust gas at 300° C. or higher discharged from the upper part of the preheater 16. Thereby, the organic chlorine compounds contained in dust are separated from the dust or thermally decomposed. As a result, in exhaust gas flowing through the exhaust gas branched pipe 350, which is further downstream than the dust feeding port 350a, the dust and organic chlorine compounds are allowed to coexist in a separated state. Dust, which is free of organic chlorine compounds, is collected by the second electric dust collector 31 in the course of flowing through the exhaust gas branched pipe 350. Dust-removed gas, which contains organic chlorine compounds separated from dust, passes through the second electric dust collector 31.

Dust collected by the second electric dust collector 31 is fed via an organic matter removed dust pipe 351 into the raw material mill 13. On the other hand, dust-removed gas, which has passed through the second electric dust collector 31, is supplied via the exhaust gas branched pipe 350 to the coal mill 50. When the dust-removed gas and coal are continuously fed, coal fine powder that has adsorbed organic chlorine compounds (such as dioxins and PCBs) is obtained. The coal fine powder is continuously fed via the powdered coal delivery pipe 352 into the burner 17.

In the anterior chamber of the rotary kiln 18, cement clinker is calcinated from cement raw materials by the heat of the burner 17. In this instance, the organic chlorine compounds contained in the coal fine powder are thermally decomposed. The thus calcinated cement clinker is stored in the clinker silo 20 after being cooled by the clinker cooler 19.

In the cement production facility 10D of the present embodiment, dust, which contains organic chlorine compounds, is allowed to be in contact with high-temperature gas. After the removal of the dust from the high-temperature gas, the dust-removed gas, which contains organic chlorine compounds, is allowed to be in contact with coal fine powder, thereby adsorbing organic chlorine compounds on the coal fine powder. It is, thus, possible to reduce the quantity of organic chlorine compounds such as dioxins and PCBs exhausted from the cement production facility 10D to a greater extent as compared with conventional facility. Further, the coal fine powder, which has adsorbed organic chlorine compounds, is used as a fuel on calcination of the cement clinker, thereby making it possible to save fuels for calcination. Organic chlorine compounds adsorbed on the coal fine powder are instantaneously decomposed by the heat on calcination of the cement clinker.

Operation of the cement production facility 10D of the present embodiment was compared with that of conventional cement production facility to study the reduction rate of organic chlorine compounds in exhaust gas released into the atmosphere (at the time of basic unit for usage of heated raw material: 50 kg/t.cli). As a result, PCBs were reduced by 95 percent by weight in the dust-removed gas; acetaldehyde, by 99 percent by weight or more; methyl alcohol, by 99 percent by weight or more; chlorophenol, by 100 percent by weight; propanol, 99 percent by weight or more; acetone, by 99 percent by weight or more; benzene, 99 percent by weight or more; and toluene, by 99 percent by weight or more as compared with those found in conventional cement production facility. These are representative harmful substances to be removed from the dust-removed gas.

INDUSTRIAL APPLICABILITY

The present invention relates to a method for reducing organic chlorine compounds in cement production facility by which a quantity of organic chlorine compounds contained in powder is reduced in the cement production facility, and the method for reducing organic chlorine compounds in the cement production facility, which is provided with a heating step for heating the powder to separate the organic chlorine compounds from the powder or decomposing the organic chlorine compounds and a gas thermal decomposing step for supplying heat-treated gas containing the organic chlorine compounds generated by heating the powder to a high temperature part of the cement production facility and thermally decomposing the organic chlorine compounds contained in the heat-treated gas. According to the present invention, it is possible to reduce the quantity of organic chlorine compounds such as dioxins and PCBs exhausted from cement production facility to a greater extent as compared with conventional cement production facility.

The invention claimed is:

1. A method for reducing organic chlorine compounds in a cement clinker, comprising:

passing crushed cement raw material comprising dust and an organic chlorine compound through an organic matter remover and heating said cement raw material in said organic matter remover during said passing, to remove said organic chlorine compound from said crushed cement raw material or to decompose said organic chlorine compound;

after said passing, heating said crushed cement raw material where the organic chlorine compound has been removed in a first heater;

depositing the crushed cement raw material from the first heater into a rotary kiln of a cement production facility; and introducing a gas generated during said passing that comprises said organic chlorine compound into a high-temperature portion of the cement production facility having an operating temperature of 800° C. or more, thereby decomposing said organic chlorine compound in said gas, wherein
said high-temperature portion is at least one of a lower stage part of said first heater, a calcinatory, a posterior chamber of said rotary kiln, an anterior chamber of said rotary kiln, and a clinker cooler.

2. The method for reducing organic chlorine compounds in a cement clinker according to claim 1, wherein the heating in the organic matter remover is carried out at a temperature of 300° C. or higher.

3. The method for reducing organic chlorine compounds in a cement clinker according to claim 1, wherein the organic matter remover is connected to an upper part of the first heater, to which the crushed raw material and the dust are supplied.

4. The method for reducing organic chlorine compounds in a cement clinker according to claim 1, wherein the heat source of the organic matter remover is at least one of exhaust gas from the upper part of the first heater, exhaust gas of a clinker cooler for cooling cement clinker discharged from the rotary kiln and heated gas generated from a gas generator annexed to the organic matter remover.

5. The method for reducing organic chlorine compounds in a cement clinker according to claim 4, wherein
a jacket for heating the powder supplied to the organic matter remover is installed outside the organic matter remover, and
the jacket is supplied with at least one of exhaust gas from the upper part of the first preliminary heater, exhaust gas of a clinker cooler for cooling cement clinker discharged from the rotary kiln and heated gas generated from a gas generator annexed to the organic matter remover.

6. The method for reducing organic chlorine compounds in a cement clinker according to claim 1, wherein said organic matter remover comprises:
a casing;
an external jacket surrounding the casing and having an inlet and an outlet for passing a heating gas around the casing;
a winding pipe present in the casing and oriented along the vertical axis of the casing and having horizontal and vertical portions;
at least one screw present within horizontal portions of the winding pipe; and
a cylindrical jacket surrounding the winding pipe and comprising a heating portion in the form of a screw, said cylindrical jacket comprising a first and second heat source supply inlet and a discharge port.

7. A method for reducing organic chlorine compounds in a cement clinker, comprising:
passing exhaust gas comprising dust that comprises an organic chlorine compound generated from a cement raw material mill through an electric dust collector to collect the dust;
thereafter heating the dust in a second heater that is connected to the electric dust collector by a cement raw material supply facility to remove said organic chlorine compound and obtain purified dust;
depositing said purified dust and cement raw material into a rotary kiln of a cement production facility; and
supplying exhaust gas comprising an organic chlorine compound generated by heating cement raw material in said second heater to into a high-temperature portion of the cement production facility having an operating temperature of 800° C. or more, thereby decomposing said organic chlorine compound in said gas, wherein
said high-temperature portion is at least one of a lower stage part of said first heater, a calcinatory, a posterior chamber of said rotary kiln, an anterior chamber of said rotary kiln, and a clinker cooler.

8. The method for reducing organic chlorine compounds in a cement clinker according to claim 7, wherein said heating the dust is carried out at a temperature of from 100° C. to 600° C.

9. The method for reducing organic chlorine compounds in a cement clinker according to claim 7, wherein the heat source of the second heater is at least one of exhaust gas from the upper part of a first heater, exhaust gas of a clinker cooler for cooling cement clinker discharged from the rotary kiln and heated gas generated from a gas generator annexed to the first heater.

10. The method for reducing organic chlorine compounds in a cement clinker according to claim 9, wherein
a jacket for heating the powder supplied to the first heater is installed outside the second heater, and
the jacket is supplied with at least one of exhaust gas from the upper part of the first heater, exhaust gas of a clinker cooler for cooling cement clinker discharged from the rotary kiln and heated gas generated from a gas generator annexed to the second heater.

11. The method for reducing organic chlorine compounds in a cement clinker according to claim 7, wherein the powder heated by the second heater is subjected to normal treatment in cement production.

12. A method for reducing organic chlorine compounds in a cement clinker, comprising:
passing exhaust gas comprising dust generated from a cement raw material mill through a first electric dust collector to collect dust comprising an organic chlorine compound;
contacting said dust comprising an organic chlorine compound with exhaust gas generated from a first heater and having a temperature of 300° C. or higher to separate said dust and said organic chlorine compound;
collecting the dust generated after said contacting with a second electric dust collector and thereby producing a dust-removed gas comprising said organic chlorine compound;
contacting said dust-removed gas with an absorbing powder to absorb the organic chlorine compound comprised with the dust-removed gas.

13. The method for reducing organic chlorine compounds in a cement clinker according to claim 12, wherein the adsorbing powder is at least one of coal fine powder, activated carbon fine powder and oil coke fine powder.

14. The method for reducing organic chlorine compounds in a cement clinker according to claim 12, wherein the exhaust gas generated from a first heater is exhaust gas from an upper part of the first heater in the cement production facility.

15. The method for reducing organic chlorine compounds in a cement clinker according to claim 12, further comprising introducing said adsorbing powder having the organic chlorine compounds absorbed thereon into a furnace of a cement clinker to burn the adsorbing powder, thereby decomposing the organic chlorine compounds.

16. The method for reducing organic chlorine compounds in a cement clinker according to claim 12, further comprising introducing dust collected from said collecting into a raw material mill for crushing cement raw materials.

* * * * *